United States Patent
Bonnain et al.

(10) Patent No.: US 12,330,887 B2
(45) Date of Patent: Jun. 17, 2025

(54) PACKAGING SYSTEM ADAPTABLE TO VARIOUS CONTAINER PERIMETERS

(71) Applicant: WestRock Packaging Systems, LLC, Atlanta, GA (US)

(72) Inventors: Jean-Christophe Bonnain, Châteauroux (FR); Frederic Limousin, Le Poinçonnet (FR); Fabrice Avril, Châteauroux (FR); Amelie Strohm-Volondat, Châteauroux (FR)

(73) Assignee: WestRock Packaging Systems, LLC, Atlanta, GA (US)

( * ) Notice: Subject to any disclaimer, the term of this patent is extended or adjusted under 35 U.S.C. 154(b) by 0 days.

(21) Appl. No.: 18/597,707

(22) Filed: Mar. 6, 2024

(65) Prior Publication Data

US 2024/0343502 A1    Oct. 17, 2024

Related U.S. Application Data

(63) Continuation of application No. 17/898,302, filed on Aug. 29, 2022, now Pat. No. 11,945,661, which is a
(Continued)

(51) Int. Cl.
*B65G 47/86* (2006.01)
*B65G 47/32* (2006.01)

(52) U.S. Cl.
CPC ........... *B65G 47/842* (2013.01); *B65G 47/32* (2013.01); *B65G 2201/0252* (2013.01); *B65G 2207/08* (2013.01); *B65G 2811/0615* (2013.01)

(58) Field of Classification Search
None
See application file for complete search history.

(56) References Cited

U.S. PATENT DOCUMENTS

| 2,829,757 A | 4/1958 | Breeback et al. |
| 3,314,519 A * | 4/1967 | Kelly .................... B67C 7/0046 |
| | | 198/467.1 |

(Continued)

FOREIGN PATENT DOCUMENTS

| EP | 3604180 A1 | 2/2020 |
| FR | 2937619 A1 | 4/2010 |
| WO | 2011048508 A1 | 4/2011 |

OTHER PUBLICATIONS

International Search Report and Written Opinion for corresponding PCT Application No. PCT/US2021/043242 dated Oct. 25, 2021 (14 pp.).  Previously cited in parent U.S. Appl. No. 17/898,302, filed Aug. 29, 2022.

(Continued)

*Primary Examiner* — Kavel Singh
(74) *Attorney, Agent, or Firm* — Brian J. Goldberg; Rohini K. Garg; Tsugihiko Suzuki

(57) ABSTRACT

A conveyor system for containers including a conveyor module configured to convey and meter a stream of containers, including a first star wheel configured to move a plurality of first containers along a first travel path, wherein the first containers each have a first geometric center, and wherein the first travel path is defined by the geometric center of the first containers, and a second star wheel configured to move a plurality of second containers along a second travel path, wherein the second containers each have a second geometric center, and wherein the second travel path is defined by the geometric center of the second containers.

20 Claims, 20 Drawing Sheets

Related U.S. Application Data continuation of application No. 17/385,537, filed on Jul. 26, 2021, now Pat. No. 11,427,410.

(60) Provisional application No. 63/056,171, filed on Jul. 24, 2020.

(56) References Cited

U.S. PATENT DOCUMENTS

| | | | |
|---|---|---|---|
| 4,660,708 A | | 4/1987 | Willerding |
| 4,803,055 A | * | 2/1989 | Ueda ..................... B65B 55/10 |
| | | | 134/48 |
| 4,832,173 A | | 5/1989 | Hattori et al. |
| 5,282,348 A | | 2/1994 | Dampier |
| 5,477,956 A | * | 12/1995 | Liebhart ................ B65G 33/04 |
| | | | 198/346.2 |
| 6,308,816 B1 | * | 10/2001 | Bankuty ............... B67C 7/0006 |
| | | | 198/395 |
| 6,651,800 B2 | | 11/2003 | Baclija |
| 7,302,785 B2 | | 12/2007 | Heuvel |
| 8,028,815 B2 | | 10/2011 | Hahn |
| 9,296,507 B2 | * | 3/2016 | Giuliani ................. B65C 3/065 |
| 9,561,876 B2 | * | 2/2017 | Ehmer .................... B65B 17/02 |
| 10,988,320 B2 | | 4/2021 | Boscaro et al. |
| 11,427,410 B2 | | 8/2022 | Bonnain et al. |
| 2010/0193331 A1 | | 8/2010 | McAllister |
| 2015/0191263 A1 | | 7/2015 | Nitsch |

OTHER PUBLICATIONS

European Office Action dated Nov. 29, 2023, 3 pages.

\* cited by examiner

PACKAGING SYSTEM ADAPTABLE TO VARIOUS CONTAINER PERIMETERS

CROSS-REFERENCE TO RELATED APPLICATIONS

The present application is a continuation of Ser. No. 17/898,302 filed on 29 Aug. 2022, now U.S. Pat. No. 11,945,661 issued on 2 Apr. 2024, which is a continuation of Ser. No. 17/385,537 filed 26 Jul. 2021, now U.S. Pat. No. 11,427,410 issued 30 Aug. 2022 which claims the benefit of priority to U.S. Provisional Patent Application Ser. No. 63/056,171 filed on 24 Jul. 2020, the contents of each of which are incorporated herein by reference in their entirety.

BACKGROUND

Technological Field

The present disclosure relates to a packing system, and more particularly to a system adaptable to various container sizes.

Description of Related Art

In the field of packaging it is often required to provide consumers with a package comprising multiple primary produce containers, such multi-packs are desirable for shipping and distribution and for display of promotional information.

It is desirable to provide a compact packaging machine, one with a reduced footprint, i.e. one that occupies less area or space within a production facility, but one that is able to display the promotional or product information properly. It is further desirable to reduce changeover times in order to reduce down time and increase the productivity of the plant and machine. Today's consumers require various sized products and it is necessary for today's producers to meet that demand. It is an object of the disclosure to present a system capable of organizing various sized products into packages and orienting them in the proper way. The conventional methods and systems have generally been considered satisfactory for their intended purpose. However, there is still a need in the art for a system having improved packaging and organizing capabilities. The present disclosure may provide a solution for at least one of these remaining challenges.

SUMMARY OF THE INVENTION

A conveyor system for grouping containers including a conveyor module configured to convey and meter a stream of containers of various dimensions including a first star wheel and a second star wheel configured to move a plurality of first containers along a first travel path, wherein the first containers each have a first geometric center, and wherein the first travel path is defined by the geometric center of the first containers, and a third star wheel and a fourth star wheel configured to move a plurality of second containers along a second travel path, wherein the second containers each have a second geometric center, and wherein the second travel path is defined by the geometric center of the second containers, wherein the first travel path and the second travel path are substantially similar. The system can also include a metering screw separating the first star wheel and the second star wheel further defining the travel path from the first star wheel to the second star wheel. A fifth star can be downstream of the second star wheel further defining the container travel path. The fifth star wheel can be part of an orienting module configured to orient at least some of the containers of the stream of containers.

A center of the first star wheel and the center of the second star wheel form a first axis and a center of the second star wheel and the center of the fifth star wheel form a second axis not parallel to first axis. The first star wheel can include more teeth than the second star wheel. Each of the star wheels can be oriented in a horizontal plane. The star wheels can be co-planar. The first star wheel of the first conveyor module can include an equal amount of teeth as the first star wheel of the second conveyor module. The second star wheel of the first conveyor module can include an equal amount of teeth as the second star wheel of the second conveyor module. A distance between centers of adjacent indentations of the second star wheel is greater than a distance between centers of adjacent indentations of the first star wheel.

A grouping module can include a track configured move a plurality of grippers. A second grouping module configured to be interchangeable with the first track based on a size of the container. The track of the second grouping module includes a different shape from track of the first grouping module. The track includes at least three straight sections, and at least one curved section.

A method including conveying a first stream of containers of a first perimeter along a path defined by a geometric center of each container, replacing the first star wheel, the metering screw, and the second star wheel of the first conveyor module with corresponding star wheels, and a metering screw of a second conveyor module, and conveying a second stream of containers of a second perimeter about the path defined by the geometric center of each container of the first stream of containers. Containers of the second stream of containers can include a diameter different than diameter of the containers of the first stream. A path of the second stream of containers can be identical to the path of the first stream of containers. The method can also include replacing a star wheel of a first orienting module with a star wheel of a second orienting module to further define the container path. A path of the second stream of containers can be identical to the path of the first stream of containers defined by the first star wheel, the second star wheel, and the star wheel of the first orienting module.

A system includes a first star wheel, a second star wheel, a first metering screw configured to be placed in line with the first start wheel and the second star wheel to move a plurality of first containers along a first travel path, wherein the first containers each have a first geometric center, and wherein the first travel path is defined by the geometric center of the first containers, a third star wheel configured to be interchangeable with the first star wheel, a fourth star wheel configured to be interchangeable with the second star wheel, and a second metering screw configured to be placed in line with the third star wheel and the fourth star wheel to move a plurality of second containers along a second travel path, wherein the second containers each have a second geometric center, and wherein the second travel path is defined by a geometric center of the first containers.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
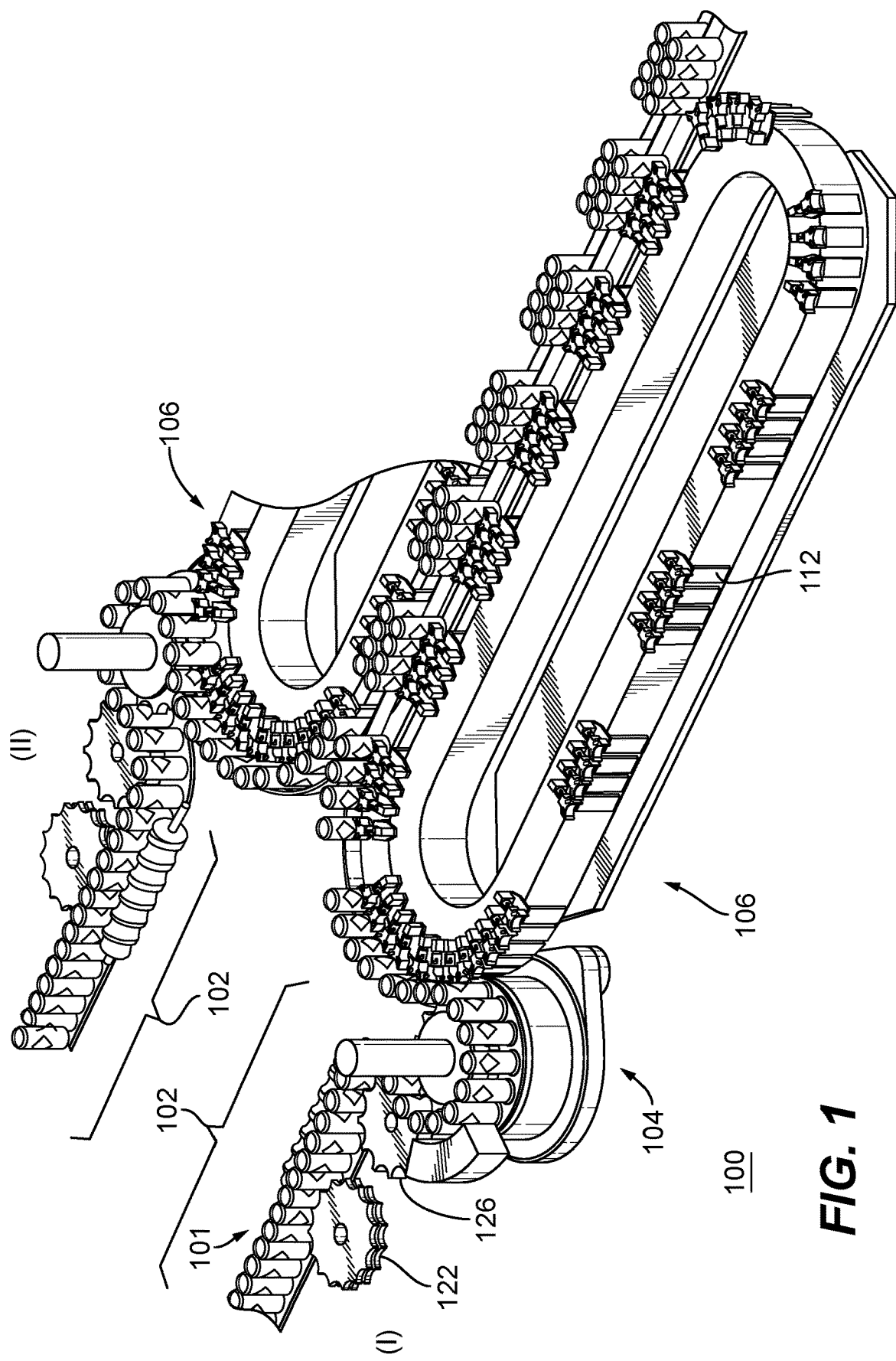
FIG. 1 is a perspective view of a system for packaging containers.

Reference will now be made to the drawings wherein like reference numerals identify similar structural features or aspects of the subject invention. For purposes of explanation and illustration, and not limitation, a partial view of an exemplary embodiment of a system for creating packages in accordance with the disclosure is shown in FIG. 1 and is designated generally by reference character 100. Other embodiments of the system and aspects thereof, are provided in FIGS. 2-17, as will be described. The methods and systems of the invention can be used to meter a stream of containers, orient each container in desired orientation and maintain that orientation throughout a packaging process.

FIG. 1 shows a system 100 capable of receiving a stream of containers 101, scanning containers 101, the orienting them into a desired direction, and organizing them into groups while maintaining the desired orientation for packaging them into packs or packages. The system 100 shown in FIG. 1 includes two mirrored sets (I and II) of modules. Each set has the same three types of modules. Each of the modules, their capabilities, details, and possible configurations will be described in detail below. Each set (I/II) includes the following modules: a conveying module 102, an orienting module 104, and a grouping module 106, one of which is labeled in FIG. 1 for set I, the other of which is only partially shown in FIG. 1 for set II. The conveying modules 102 are each configured for receiving the stream of containers 101 and providing an initial spacing and metering the containers 101. Each orienting module 104 is configured for scanning and orienting the containers as necessary. The grouping modules 106 are each configured for organizing the oriented containers 101 into packs and groups. Although two sets I and II are shown in FIG. 1, each module in the subsequent figures and in the description below will be discussed as part of an individual set, not including its mirrored counterpart.

The system 100 offers multiple benefits over previous conveyor systems in a world that demands faster and more efficient production techniques. The following is a non-exhaustive list of the benefits offered by system 100: it allows users a faster and more convenient changeover between differing container sizes and types, the system allows for faster, more reliable, and more effective methods of packaging containers into groups, all while taking up less factory floor space.

Figure 2:
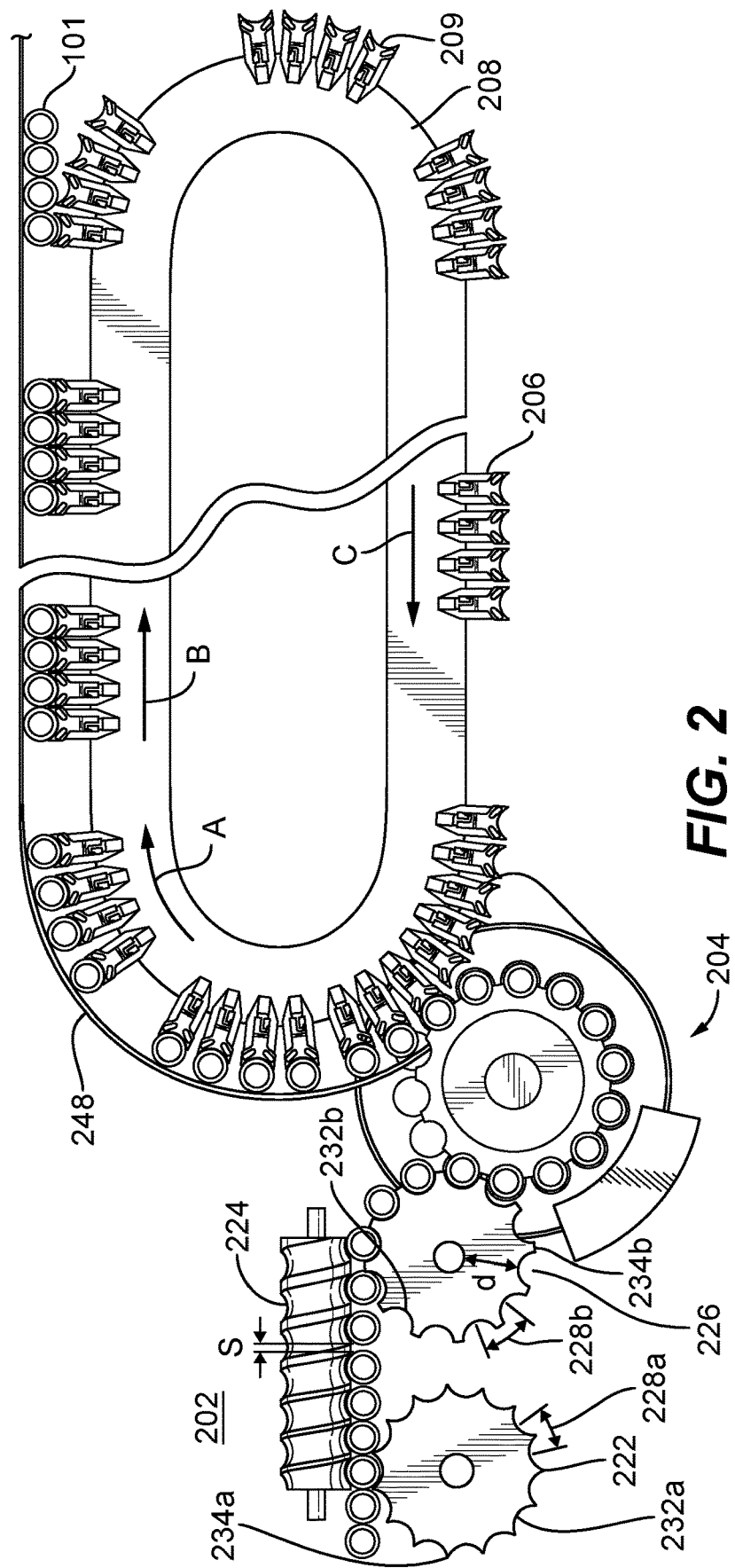
FIG. 2 is a top view of the system of FIG. 1, showing a layout of one of the sets of modules.

FIG. 2 shows an embodiment of one of the sets of modules, i.e. set I, of the system 100. Set I includes a conveying module 202, an orienting module 204, and grouping module 206 consisting of a single oval track 208 wherein grippers 209 attached to lugs 211 that move the containers 101 along the track 208. Each lug 211 is driven about the track 208 by its own respective linear servo drive 112 (shown in FIG. 1). This allows for programming a of a specific speed profile for each lug 211 or group of lugs, which can move separately from one another to form groups of containers 101. Another added benefit of the horizontal oval configuration of the track 208 is when power to the system is lost, the lugs 211 stay in place and are not moved by gravity and do not fall from the track 208.

Figure 3:
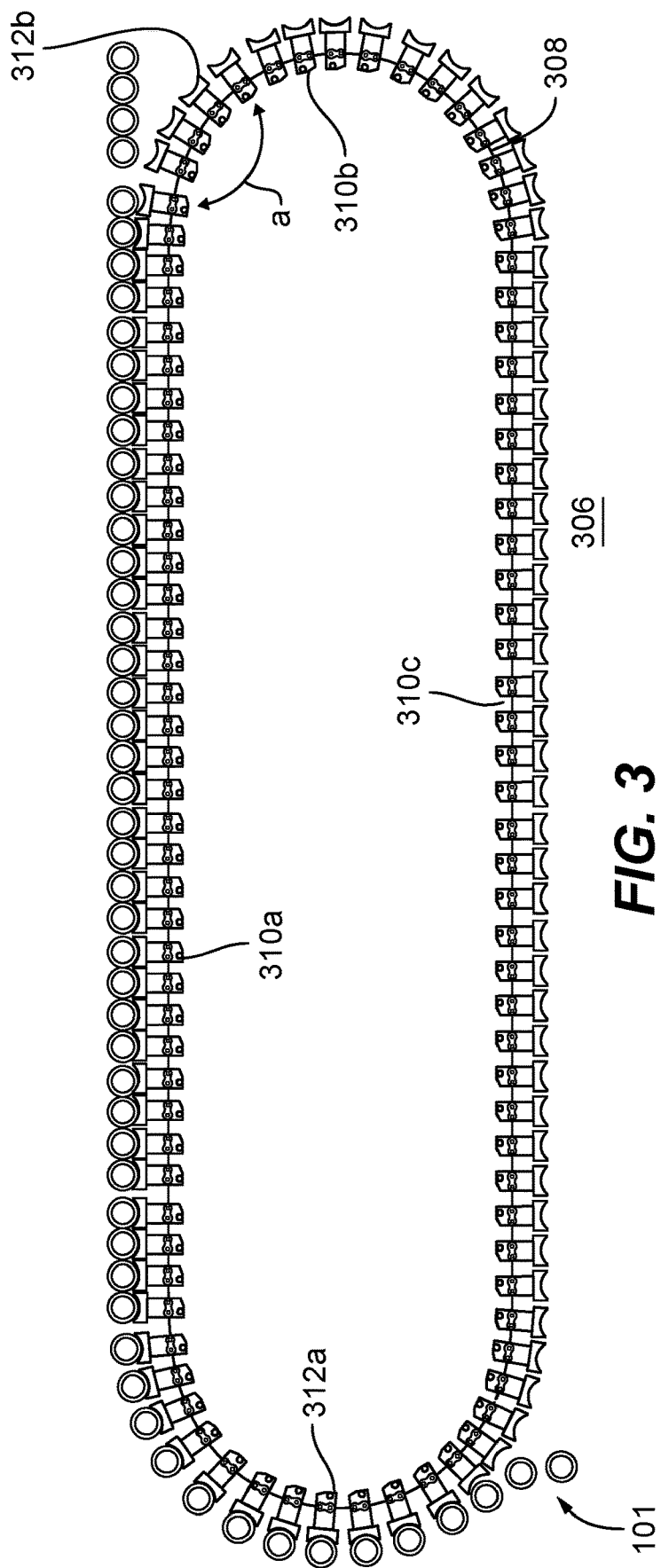
FIGS. 3-6 are top views of the system of FIG. 1, showing various embodiments of the grouping modules of FIG. 1.
Figure 4:
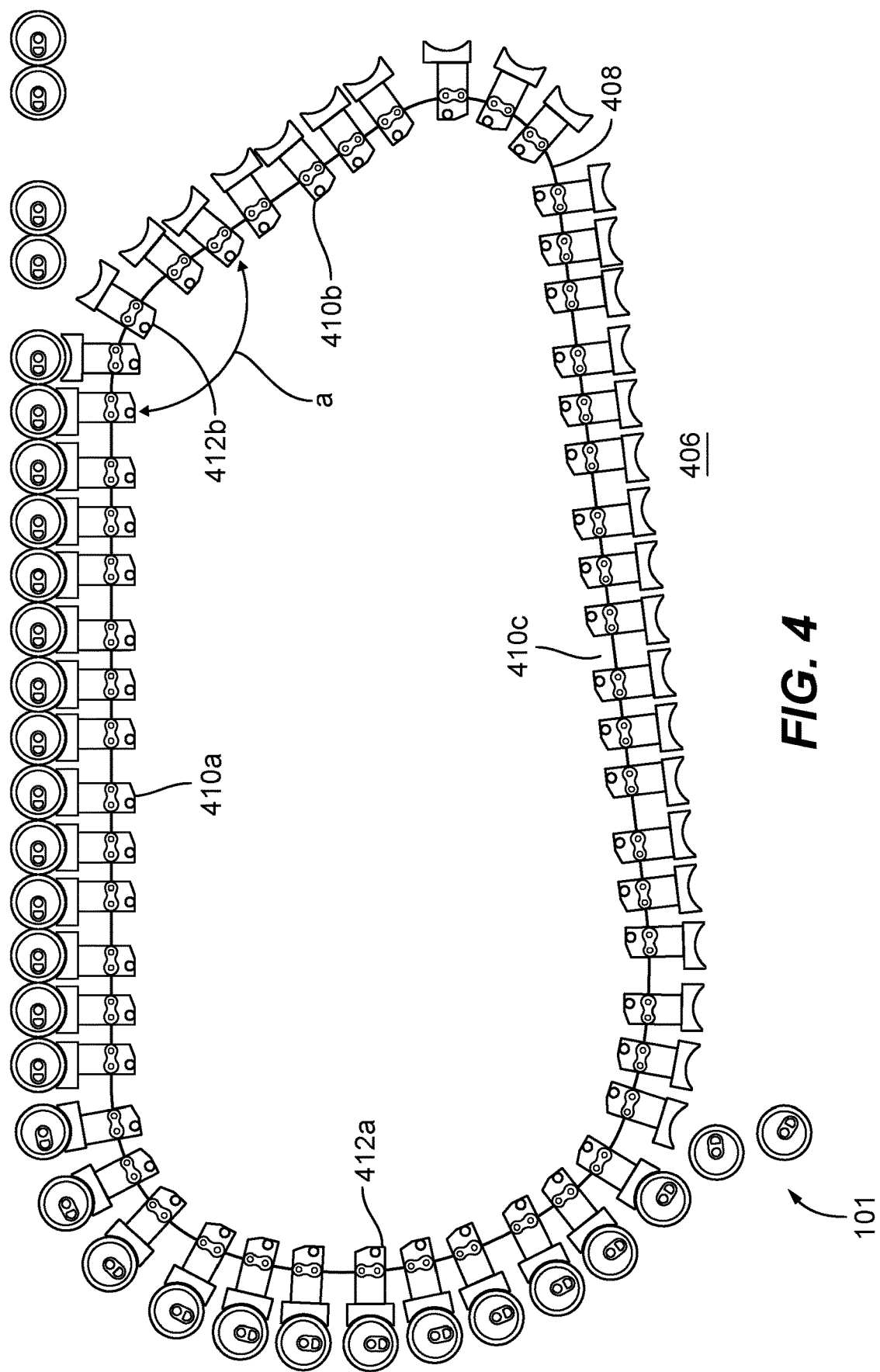
Figure 5:
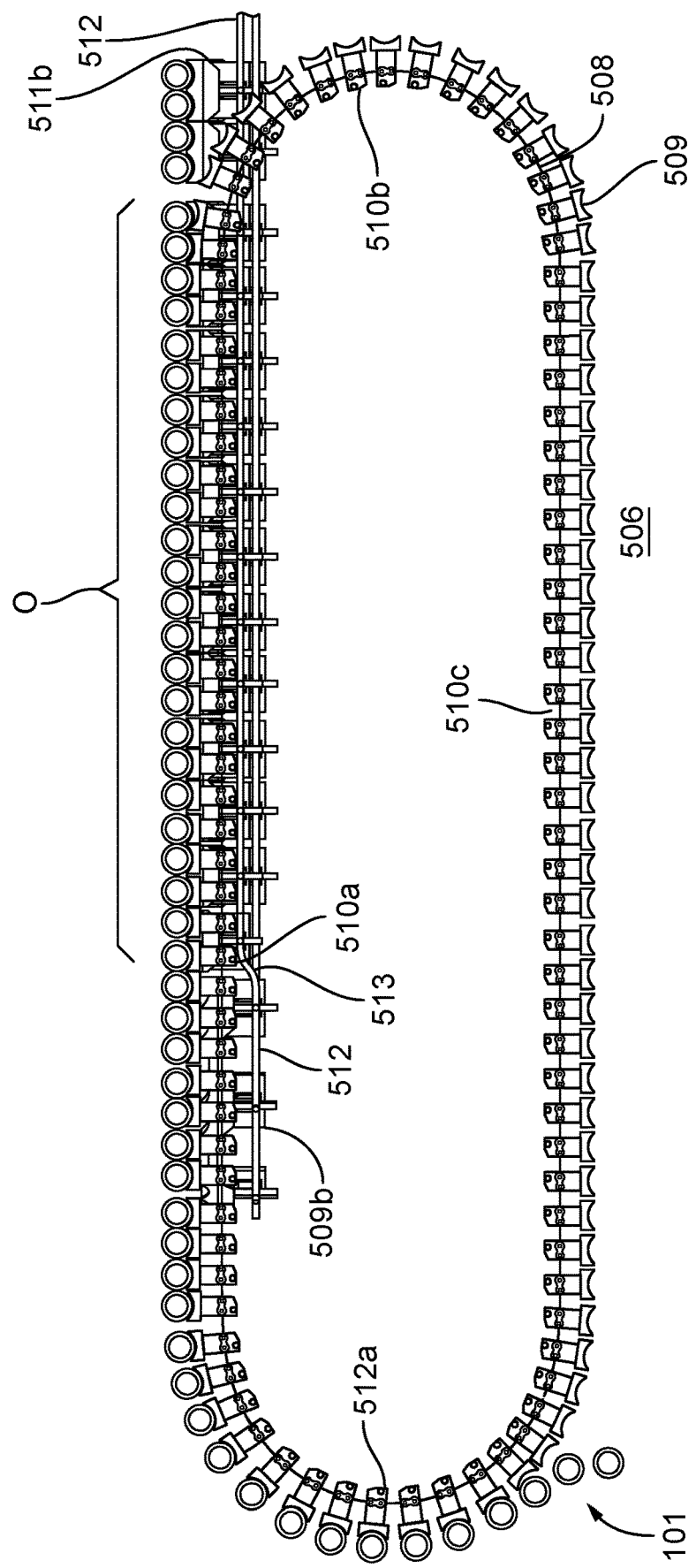
Figure 6:
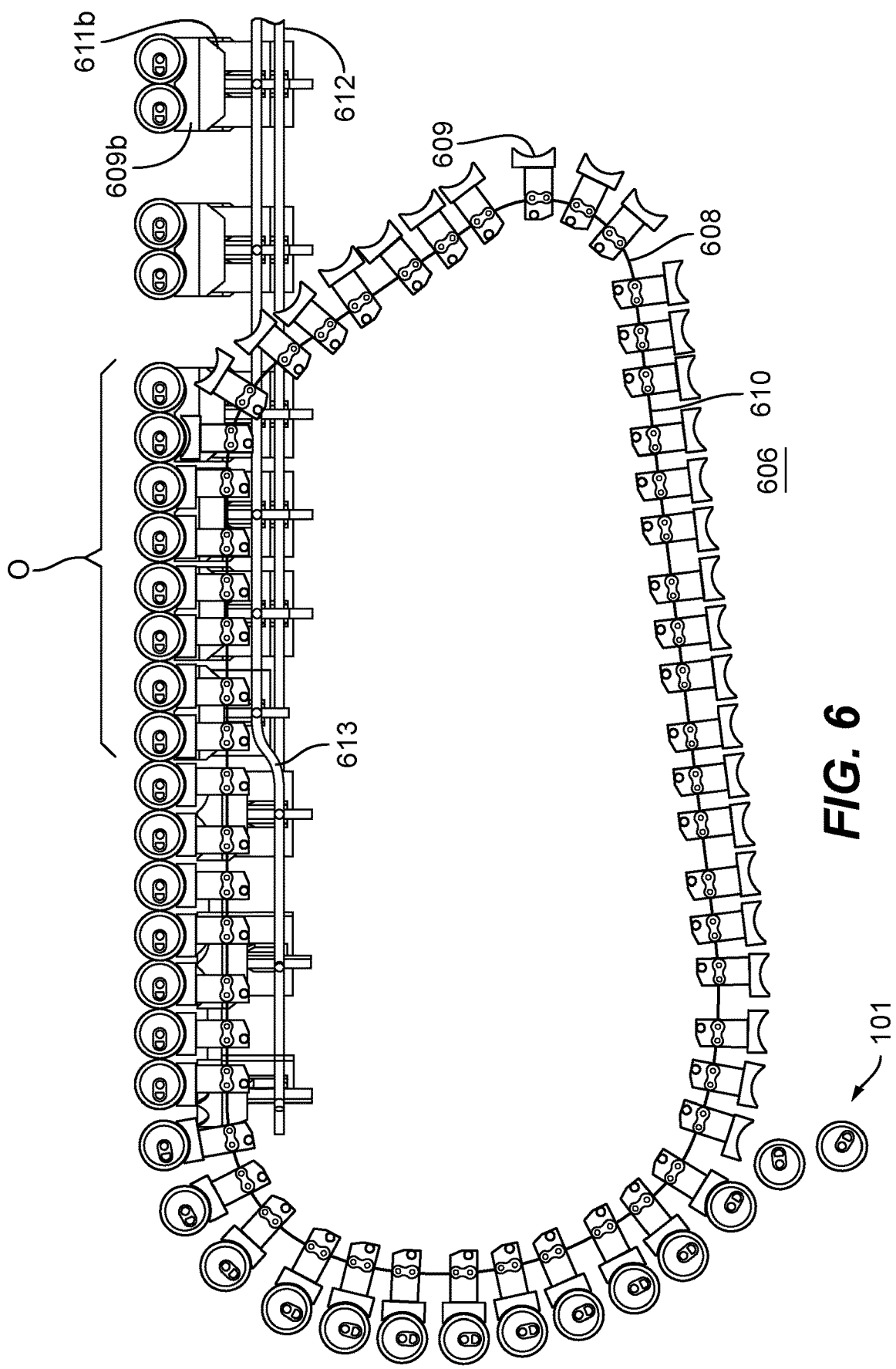

FIG. 3 shows an embodiment including a grouping module 306 having a single oval track 308 wherein grippers 309 that move the containers 101 along the track 308 are each moved about the track 308 by a chain 310. FIG. 4 shows of an embodiment grouping module 406 including a single track 408 including at least three straight sections 410a, 410b, and 410c, and at least two curved sections 412a and 412b. FIG. 5 shows an embodiment of a grouping module 506 including an oval track 508 where the grippers 509 that move the containers 101 along the track 508 are each moved by a chain 510 and second track 512 is disposed in a vertical plane that takes the container hand-off from the first track 508. The track 508 including at least two straight sections 510a and 510b and two curved sections 512a and 512b The second track uses a second set of grippers 509b and second set of lugs 511b to transport the containers after receiving them from the first track. FIG. 6 a grouping module 606 consisting of an oblong track 608, as with the embodiment of FIG. 4, where grippers 609 that move the containers 101 along the track 608 are each moved about the track by a chain 610 and second track 612 is also disposed in a vertical plane that receives container 101 from the first track 608. Each of these embodiments include unique benefits as will be described below.

Each conveying module 102, 202, 302, 402, 502, 602, mentioned above, receives a stream of containers 101. Tracks 208, 308, 408, 508, 608 can all be used with a conveying module 102 as shown in FIG. 1. At this point, the stream of containers 101 typically does not have spacing between each container 101. As the stream of containers 101 reaches the conveying module 102 the stream meets a first star-wheel 122, which helps straighten the stream 101 and feed the containers of the stream to a metering screw 124. The metering screw 124 creates a pitch (i.e., increases from a first pitch to a second pitch) or predetermined spacing (s) between each of the containers. The metering screw 124 then feeds the spaced stream of containers 101 to a second star-wheel 126.

The second star-wheel 126 has a different shape than the first star-wheel 122. As seen in FIG. 2, the second star-wheel 226 has a larger spacing between the centers 228b of each adjacent divot 232b than the spacing between the centers 228a of each adjacent divot 232a. The second star-wheel 226 also includes a wider tooth 234b than the tooth 234a of the first star-wheel 222. However, the size of the divot 232 of each star-wheel remains the same, in order to accept and handle a container 101 of the same diameter. It is also considered that star-wheels with non-circular divots can be used in order to convey non-circular containers such as juice boxes, milk cartons, or motor oil. The second star-wheel 226 typically has a smaller diameter, d, and spins faster than the first star-wheel 222. This combination of star-wheels 222, 226, taken alone and in combination with others, allows for a more compact footprint of the conveying module 202 and of the overall system.

Figure 7:
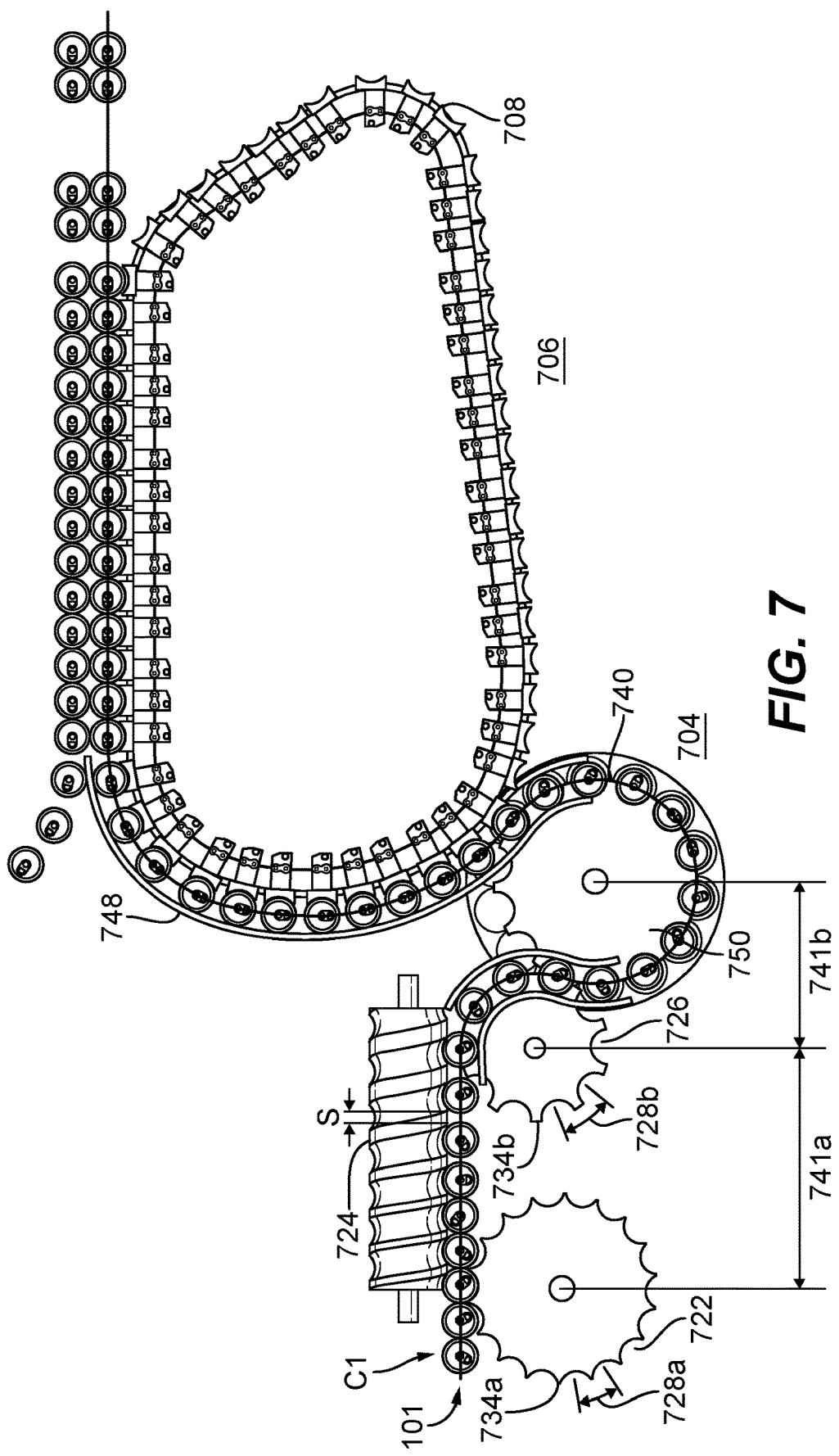
FIGS. 7, 8, and 9 are top views of the conveyor modules of the system of FIG. 1, showing equivalent paths for containers of various sizes through the conveyor module and the orienting module.
Figure 7A:
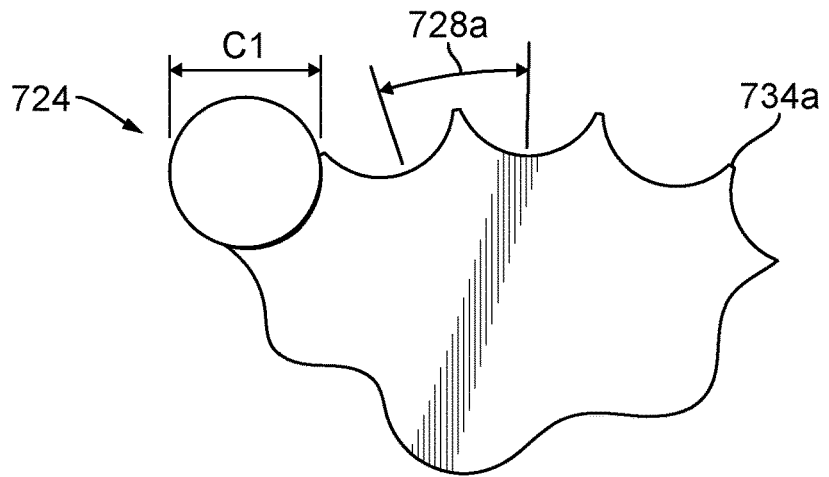
FIGS. 7a-7c, 8a-8c, and 9a-9c show detailed top views of each of the star wheels of FIGS. 7, 8, and 9, respectively.
Figure 7B:
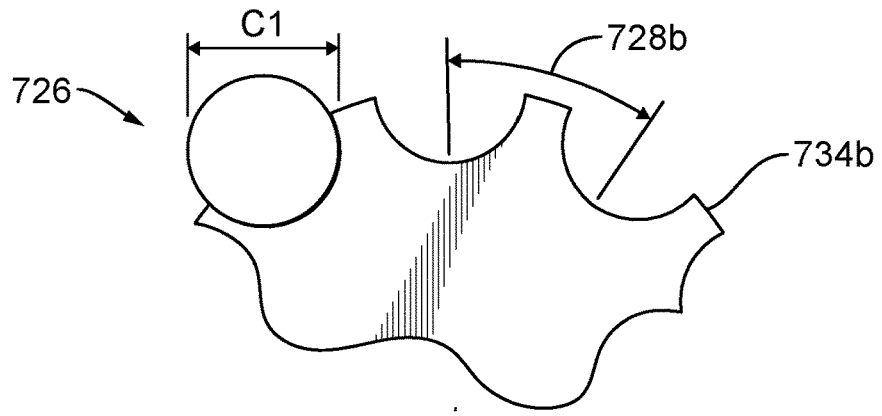
Figure 7C:
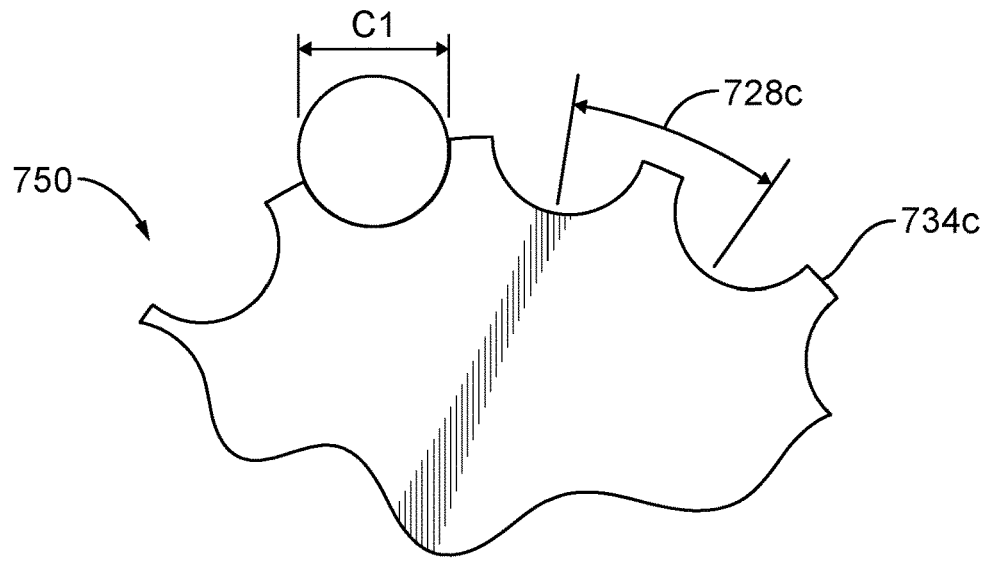
Figure 8:
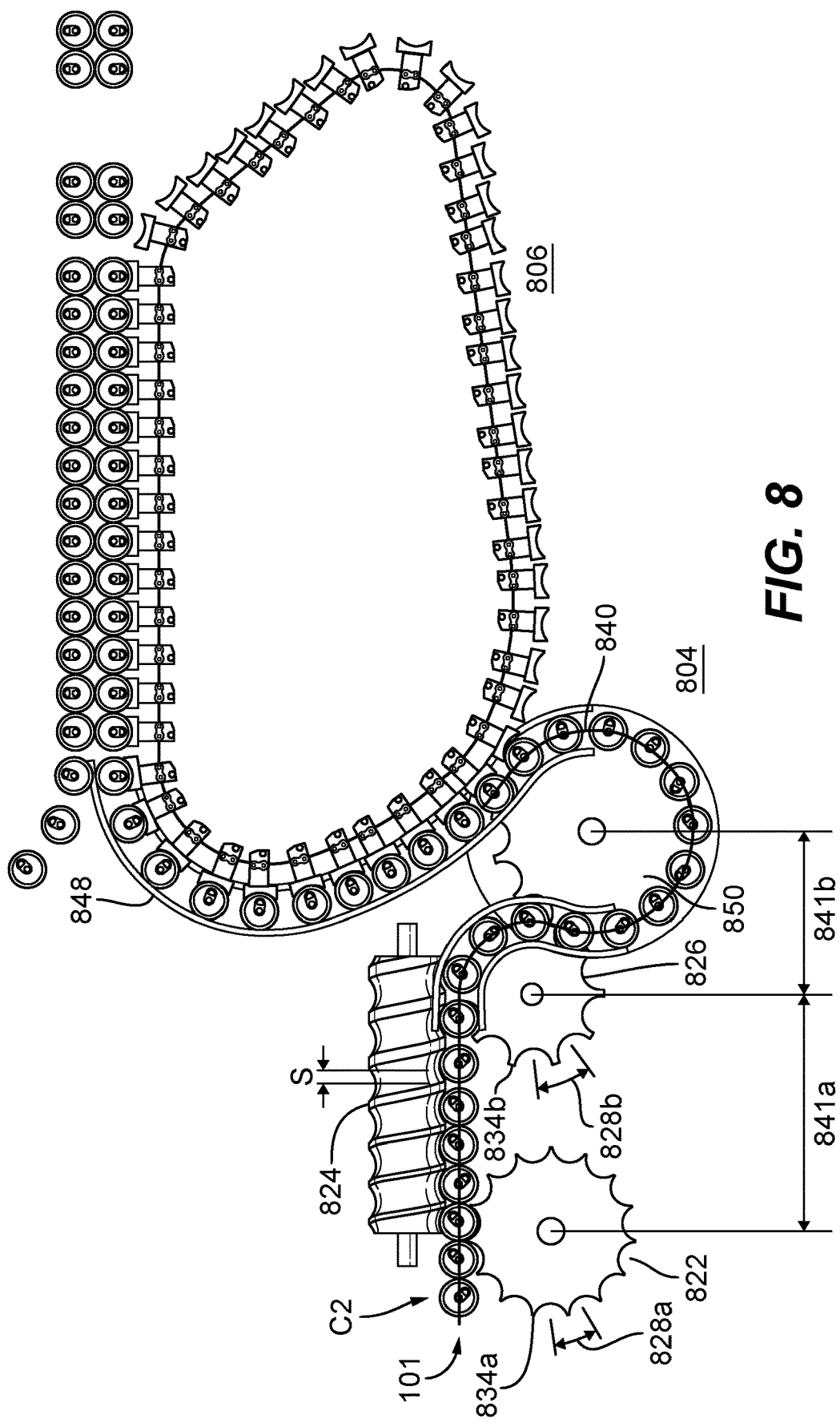
Figure 8A:
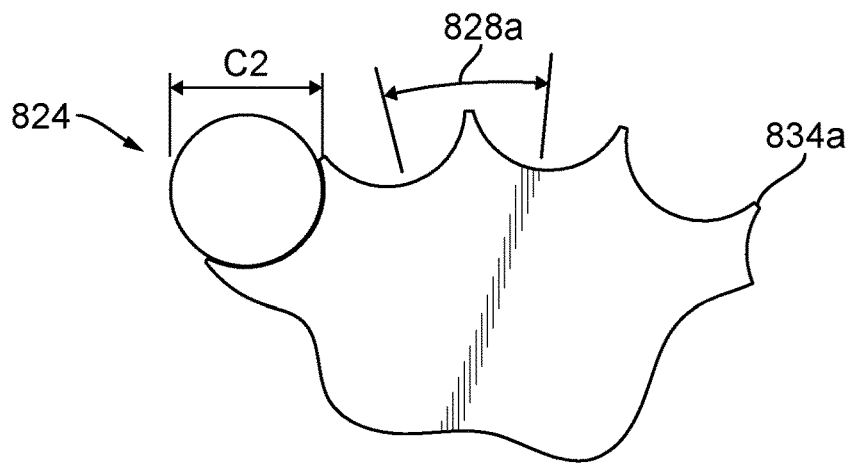
Figure 8B:
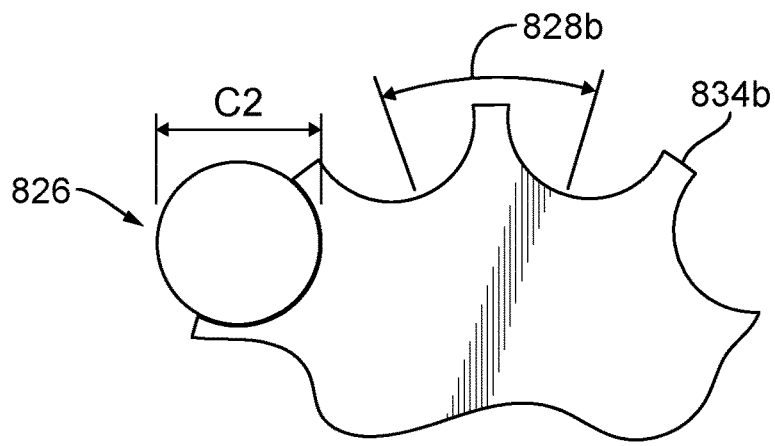
Figure 8C:
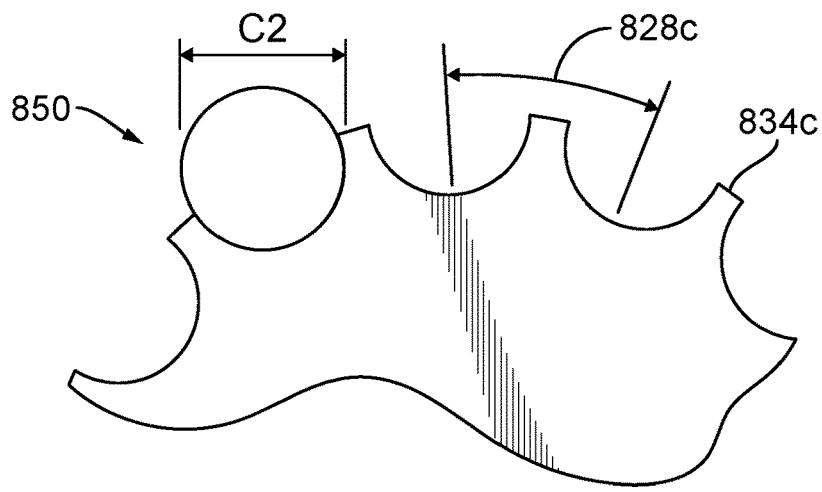
Figure 9:
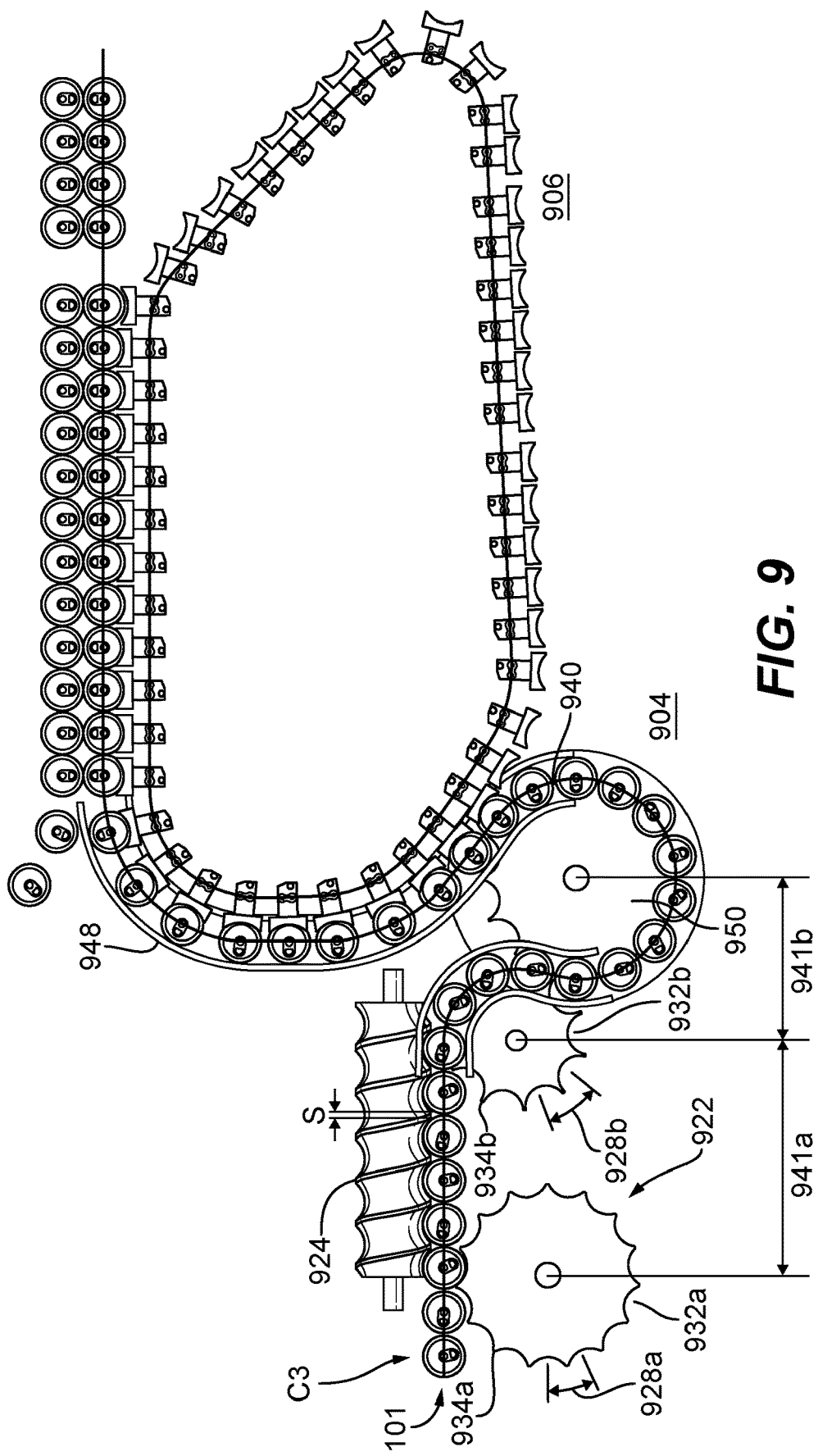
Figure 9A:
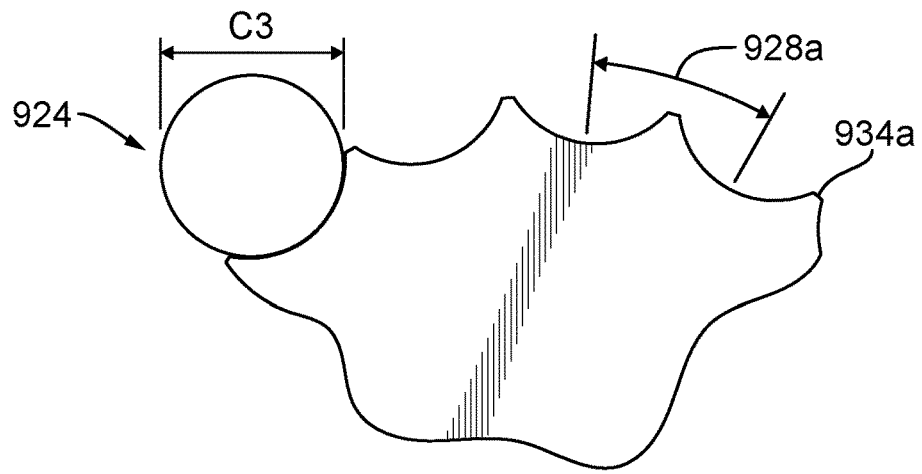
Figure 9B:
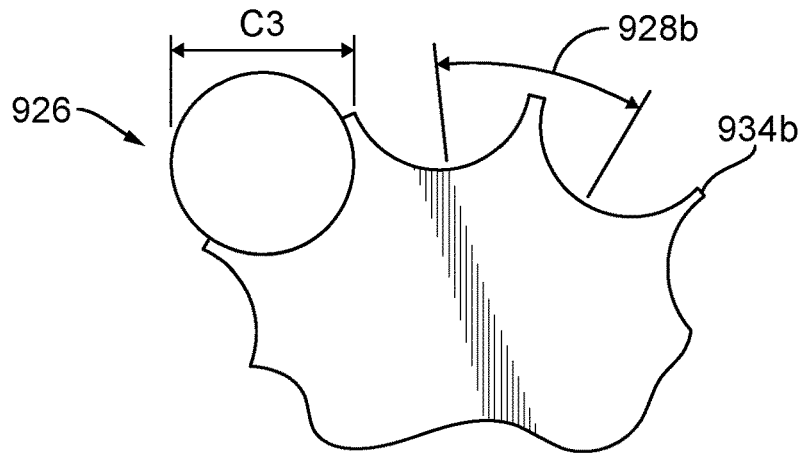
Figure 9C:
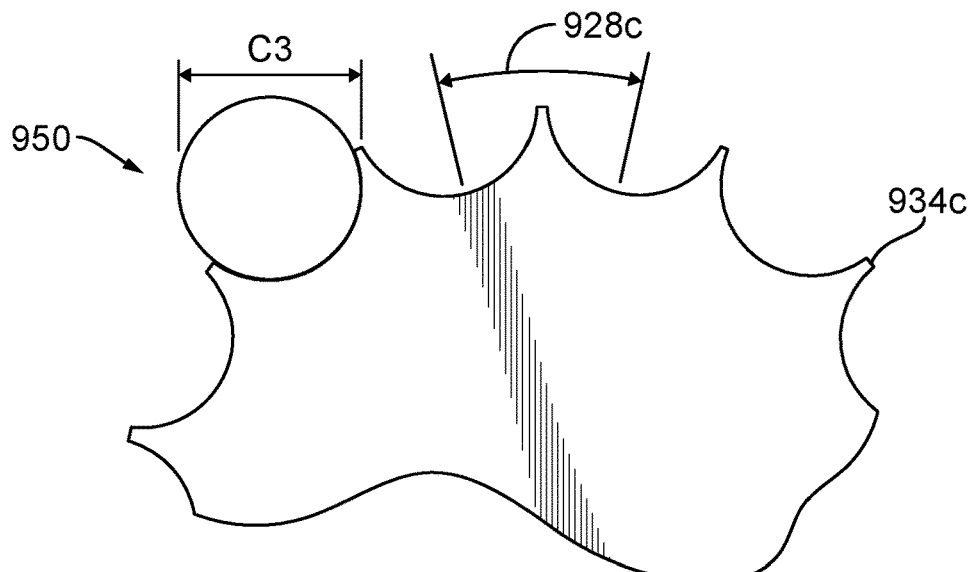

As seen in FIGS. 7-9, the stream of containers 101 forms a path 740 for the stream of containers 101 from the first star-wheel 722 to the first track 708 of the grouping module 706. The path 740 is defined by travel path of the center of each container 101. The path 740 stays substantially the same even if the diameter of the containers 101 changes, e.g. after switching out star wheels to change container size as described above. When comparing FIGS. 7, 8, and 9, the containers 101, C1 of FIG. 7 are smaller in diameter than the containers 101, C2 of FIG. 8, which are smaller in diameter than the containers 101, C3 of FIG. 9. However, the path 740 of the centers of the containers 101 is substantially the same starting from the first star-wheel 722 of the conveying module 702 through the star-wheel 750 of the orienting module 704. The path 740 is maintained by swapping-out the first star-wheel 722, the metering screw 724, the second star-wheel 726 and the star-wheel of the orienting module 750 for a corresponding one of these parts. Each of these parts 722, 724, 726 are swapped out for corresponding parts having the same amount of teeth 734 and divots 732, but a deeper and wider divot 732, and thinner teeth 734 (for larger containers 101) or a thicker tooth 734 and narrower divot 732 (for smaller containers 101). FIG. 7a-7c show the details of each of the star wheels (e.g., distance between divots 728a being less than distance between divots 728b; tooth 734b being wider than tooth 734a; distance between divots 728b and distance between divots 728c being approximately equal; thickness of tooth 734b being approximately equal to thickness of tooth 734c, etc.), which can be interchanged as needed with the star wheels shown in FIGS. 8a-8c, and FIGS. 9a-9c showing details thereof (e.g., distance between divots 828a, 928a being less than distance between divots 828b, 928b; tooth 834b, 934b being wider than tooth 834a, 934a; distance between divots 828b, 928b and distance between divots 828c, 928c being approximately equal; thickness of tooth 834b, 934b being approximately equal to thickness of tooth 834c, 934c, etc.). The axis on which each of the components 722, 724, 726 rotates stays the same after changing star wheels 722, 726. Further, the distances 741a and 741b stay the same between FIGS. 8 and 9, where they are labeled 841a and 841b and 941a and 941b. The star-wheels 822, 826 are left on the same vertical axels and the metering screw 824 is left on the same horizontal axel. This allows a system 100 to be easily changed for an infeed container 101 with a different diameter, e.g., different can diameter C2 or C3.

As seen in FIGS. 7-9, the path of the containers 101 after the orienting module 704/805/904 is different from FIG. 7 to FIG. 8 to FIG. 9. In previously used systems, the placement of each module differs from FIG. 7 to FIG. 8 to FIG. 9, which in turn required more movement of modules and lengthier changeover times between different sized/shaped containers. This system saves time in changeovers, e.g. for different can sizes, and reduces the possibility of errors in those changeovers because less parts have to be moved to accommodate differing parts.

Figure 10:
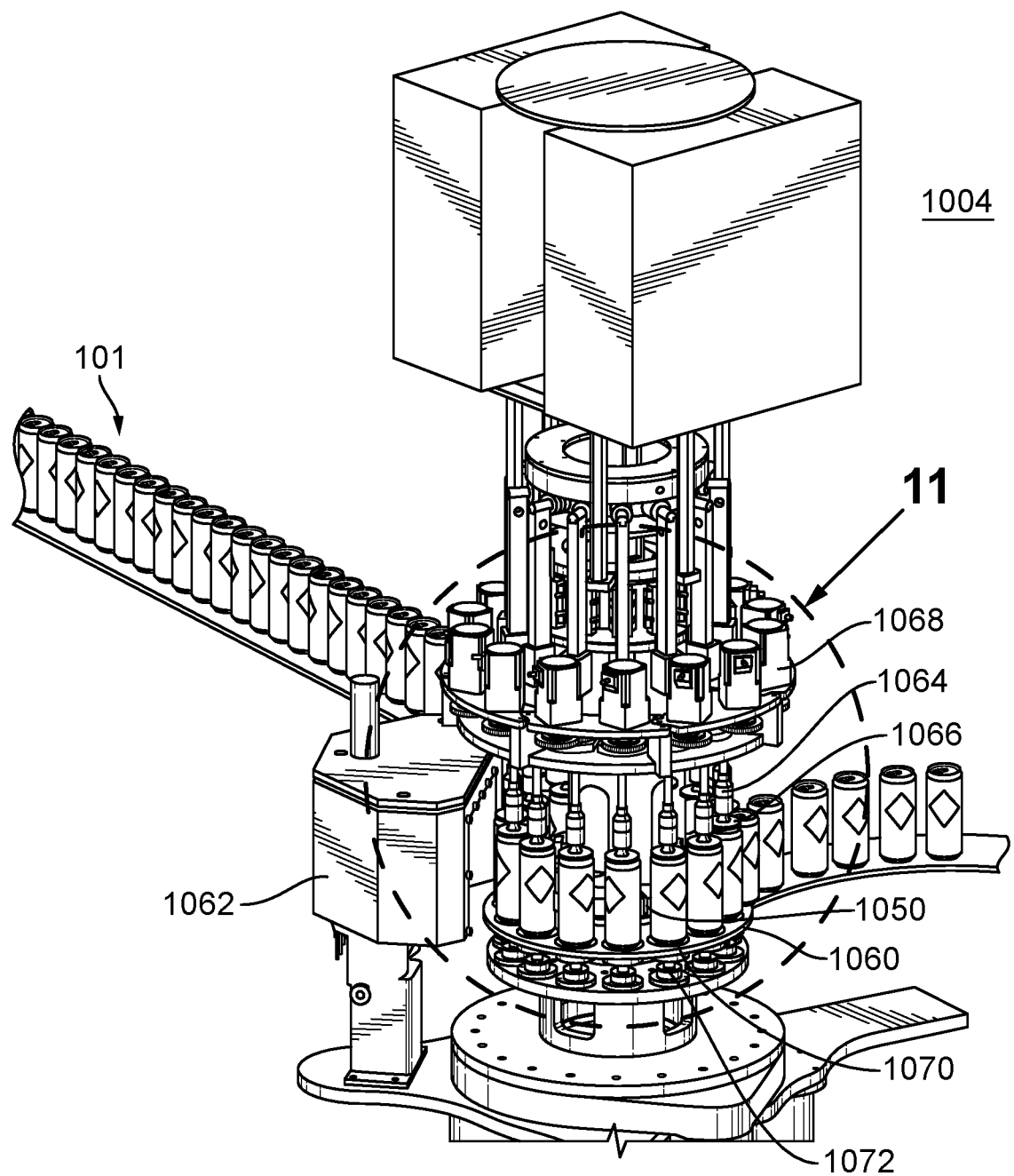
FIG. 10 is a perspective view of the orienting module of the system of FIG. 1.

As each container 101 passes the second star-wheel 726, the container 101 is fed to the orienting module 704. FIG. 10 shows a perspective view of the orienting module 1004. The orienting module includes a base 1060, which supports the incoming containers 101, a camera 1062 located to the side of the base 1060, scanning the containers container 101 and a plurality of turning members 1064 moveably positioned above the base 1060 that contact and turn the containers 101. A processor (not shown) is operatively connected to the camera 1062. The processor analyzes the initial orientation of the containers 101, i.e. before they are properly oriented. In some embodiments it is considered that the camera 1062 is required to scan every single container, and in other embodiments the camera 1062 is only required to scan every second, or third or fourth container. Depending on downstream packaging steps, and client specifications, each and every container 101 might be required to face the same direction. After the incoming orientation of the containers 101 has been analyzed, the processor computes a necessary correction. Each container 101 needs a different correction from the other containers 101 because the incoming orientation could be different, and/or because the final orientation needs to be different for each container 101.

Multiple containers 101 can be used to create a single large graphic when placed adjacent to each other within the package. Adjacent containers within one package can have a different orientation showing a different graphic or portion of a graphic to a customer. Alternatively, adjacent containers can form one large graphic seen across multiple containers. For instance the graphic "CANS" can consist of four containers. Each container can be showing either a 'C', an 'A', an 'N' or an 'S'.

The orientation module star-wheel 1050 is positioned above the rotatable base 1060 to help secure the containers 101 as they rotate past the camera 1062. As the containers 101 move past the camera 1062 the orientation star wheel helps guide them, and provide further stability as they get oriented. The star-wheel 1050 of the orienting module 1004 has the same spacing between centers of adjacent divots 1032 as the second star-wheel 1026 of the conveying module 1002, as well as the same tooth 1034 thickness. It is important to maintain spacing between each container 101 so that the camera 1062 is able to properly identify the incoming orientation of each container 101. Without spacing between each container 101 adjacent containers 101 will be recognized as a single item by the camera, and will not be able to transmit required information to the processor.

FIG. 10 further shows the turning members 1064. Each turning member 1064 corresponds to one container 101. In order to turn each container 100, a turning member 1064 moves down in order to come into contact with the container 101. As the turning member 1064 moves down a disc 1066 located on the bottom of each turning member 1064 contacts a top of each container 101 when the turning member 1064 actuates from a retracted position to a deployed position. When the disc 1066 comes in contact with each container 101, each turning member 1064 rotates each container 101 a necessary amount to place the container 101 in the desired orientation. Further seen in FIG. 10, a plurality of surfaces 1070 located within the base 1060. Each of these surfaces 1070 corresponds to a turning member 1064 and to a container. The surfaces 1070 are also operatively connected to the processor and programmed to turn the same direction and the same amount as each of the turning members 1064.

Figure 11:
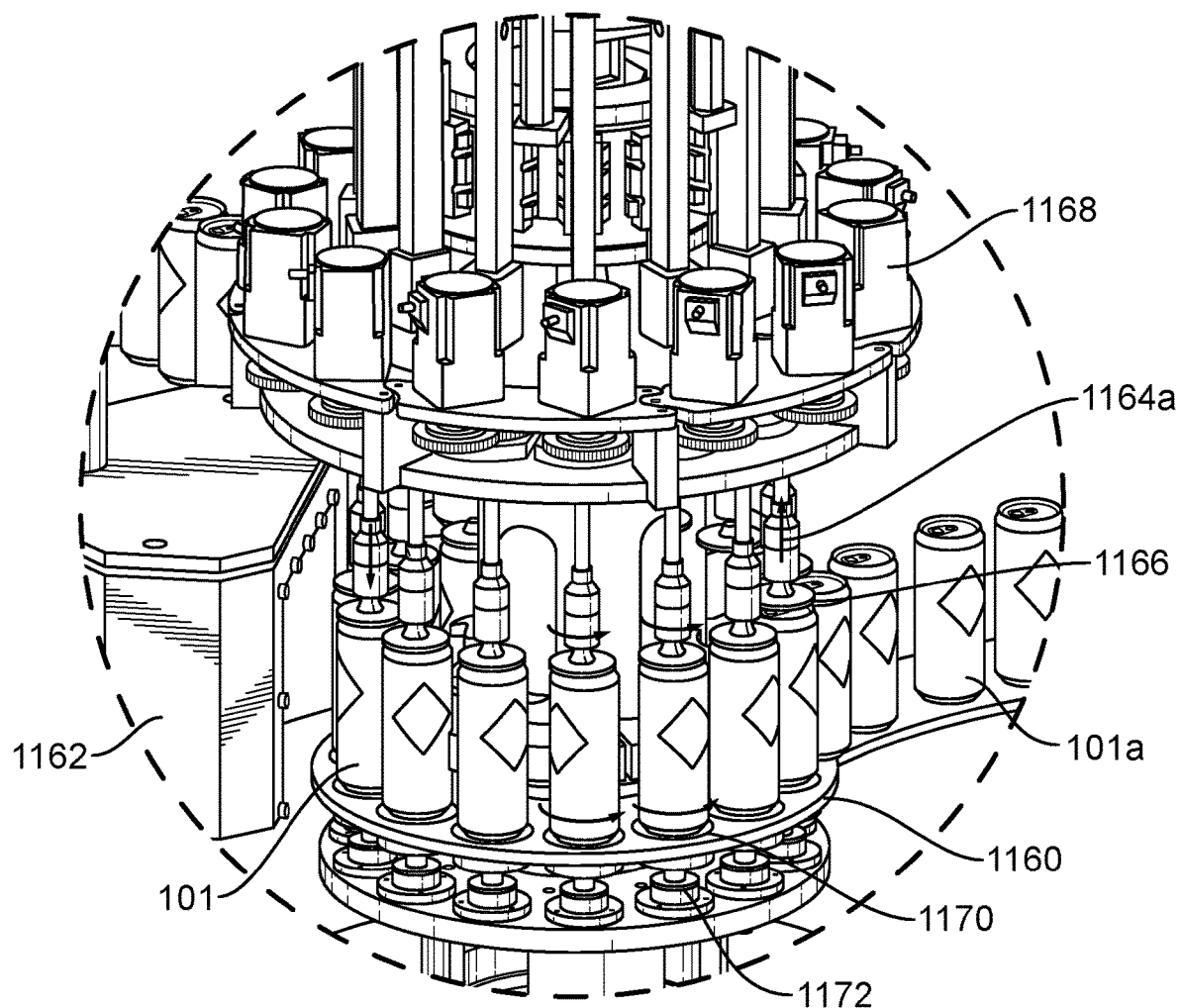
FIG. 11 is a perspective view of the orienting module of FIG. 10 showing motion of the containers.

Thus the containers are turned evenly from the top and from the bottom, further ensuring stability during turning. The motor 1072 for each of these surfaces 1070 is located below the top surface of the base 1060. The particular orientation, with moving turning members 1064 above the containers and a vertically stationary surface 1070 below the containers allows for a smaller motor and smaller turning turret, since each container 101 does not need to be moved vertically. Once the containers 101 are properly oriented the containers 101 are moved to the grouping module 106. FIG. 11 shows a subsequent view of the orientation module of FIG. 10, with like numerals corresponding to like elements (e.g., 1160, 1162, 1166, 1168, 1170, 1172 corresponding to 1060, 1062, 1066, 1068, 1070, 1072, respectively). In this view it is possible to appreciate the now oriented containers 101 which were previously oriented in different directions, as well as the now retracted turning members 1164a, which were previously in contact with the tops of containers 101.

Figure 12:
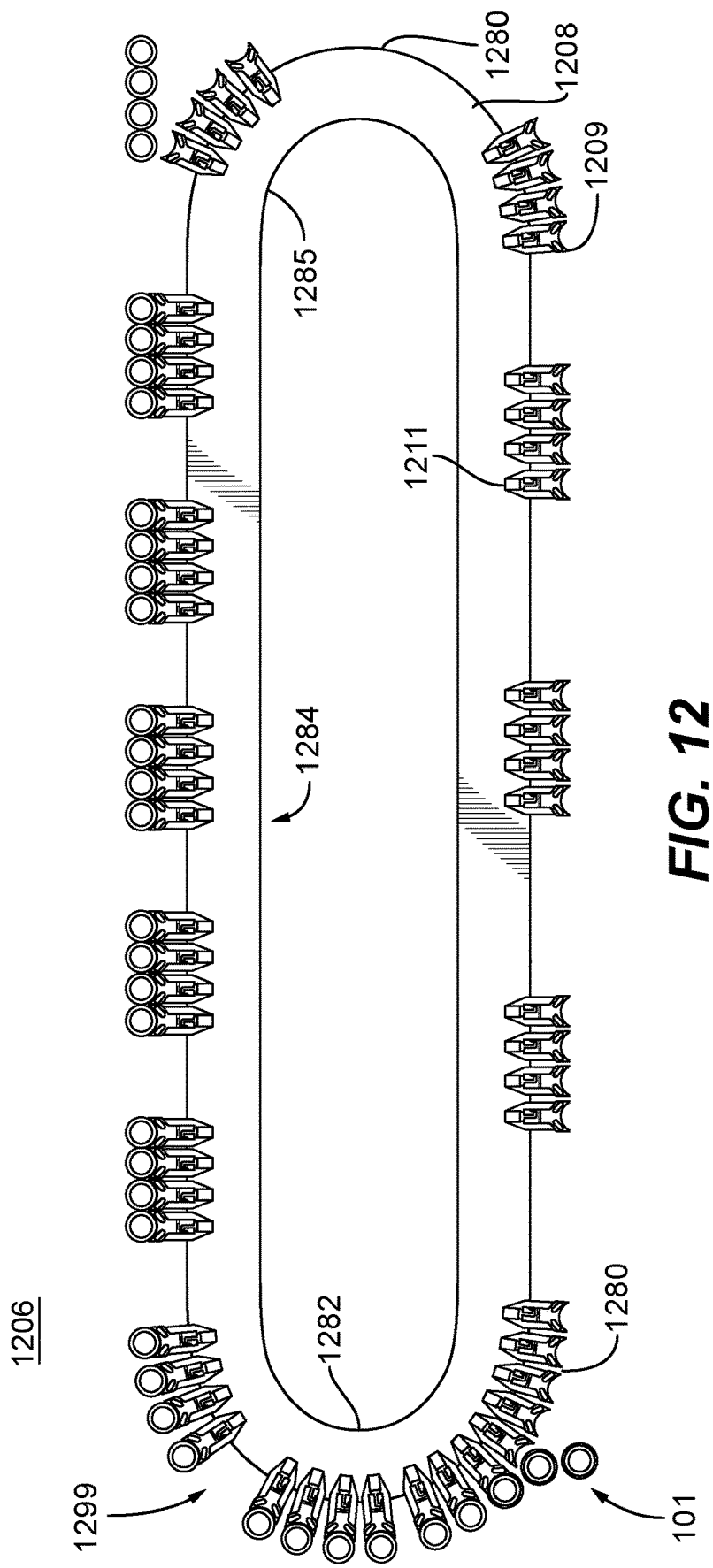
FIG. 12 is a top view of a grouping module of FIG. 1.

Referring now to FIG. 12, after containers 101 are oriented within the orienting module 1204, the stream of containers 101 are passed the grouping module 1206. The grouping module 1206 is responsible for grouping a necessary amount of containers 101 together, e.g. to begin forming packs of containers for subsequent packaging, while at the same time ensuring that the orientation of each individual container 101 remains unchanged from the orientation that was received from the orienting module 1204. As described above, a number of possibilities are presented for taking the stream of containers 101, and grouping them while ensuring that the desired orientation is maintained. FIG. 12 shows a first embodiment of the grouping module 1206 as was previously shown in FIG. 2. The grouping module 1206 includes a single oval track 1208 oriented in the horizontal plane. FIG. 12 further shows grippers 1209, which push the container 101 along the track attached to individual lugs 1211 where each lug is actuated by a linear servo drive 112 (shown in FIG. 1). The linear servo drive 112 (shown in FIG. 1) allows for programming individual or group lug 1211 speed profiles along the track 1208 for the lugs 1211 to follow.

As further seen in FIG. 12, as the containers 101 are circulated from the orienting module 1004 to the grouping module 1206, the lugs 1211 move the attached grippers 1209 in place to receive the containers 101. The lugs 1211 are arranged prior to picking up the containers 101 in a queuing section 1280, and accelerate around the first curved portion 1282 of the track once a desired group (in this case it is four containers 101) of containers 101 have been contacted in order to create a gap 1299 between this groups and the next group of containers 101, while maintaining the desired orientation of the containers 101 of the group of containers 101. Once the group has reached the straight section 1284, the group of containers 101 travel at a constant speed. At this point various packaging steps can take place. Each formed group can meet a group from the mirrored set II shown in in FIG. 1 to make a single group, e.g. an eight-pack, or four-pack.

Figure 13:
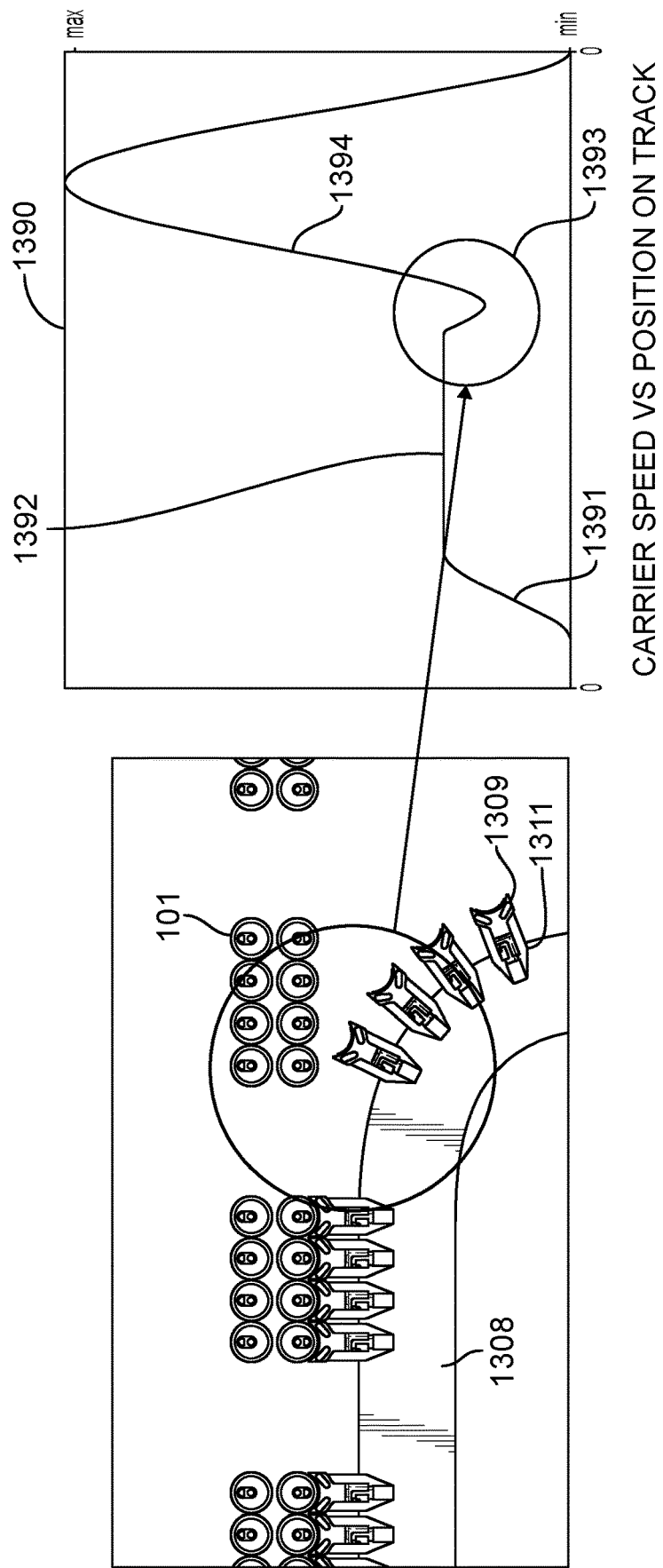
FIG. 13 shows a graphical interpretation of the velocity profile for lugs and grippers for a grouping module of FIG. 12.

With reference now to FIG. 13, as the lugs 1211 travel around the track, the lugs 1211 follow a programmed speed profile. This allows any plurality of lugs 1211 to be arranged together to form a desired group (two together, three together, etc.). After the lugs 1211 and grippers 1209 have reached the end of the first straight section 1284, the lugs 1211 peel away from the containers 101 at location 1285 in FIG. 12. One method the grippers 1209 and lugs 1211 peel away is by slowing down to allow the containers 101 to keep moving forward at the point where the straight portion turns to the second curved portion. This speed profile allows for the gripper and container 101 to gain separation from each other before the gripper changes directions, preventing the gripper from shifting, turning, or otherwise disturbing the containers 101. After the grippers 1209 are free of the containers 101, they accelerate around the rest of the second curved portion of the track and the second straight portion of the track to join the lugs 1211 in the queuing section.

FIG. 13 shows a graphical interpretation of the velocity profile for a lug and gripper as described above. The profile includes an acceleration 1391 immediately after contacting the last container 101 in the intended group of container 101 (the second in the package of two, and the third in a package of four). The acceleration 1391 allows the group to produce the gap 1299 from the next group. Afterwards containers 101 are moved along at a constant speed 1392, while packaging steps to the containers 101. In order to drop off the container 101 smoothly without disturbing them the lugs 1311 and gripper can be slowed down 1393, as the containers 101 are moved away by another conveyor or lug and carrier combination, as described above. After the containers 101 are dropped off the grippers 1309 the lugs 1311 and grippers 1309 accelerate 1394 to the highest velocity in order to return to the queuing section before picking up another container.

Figure 14:
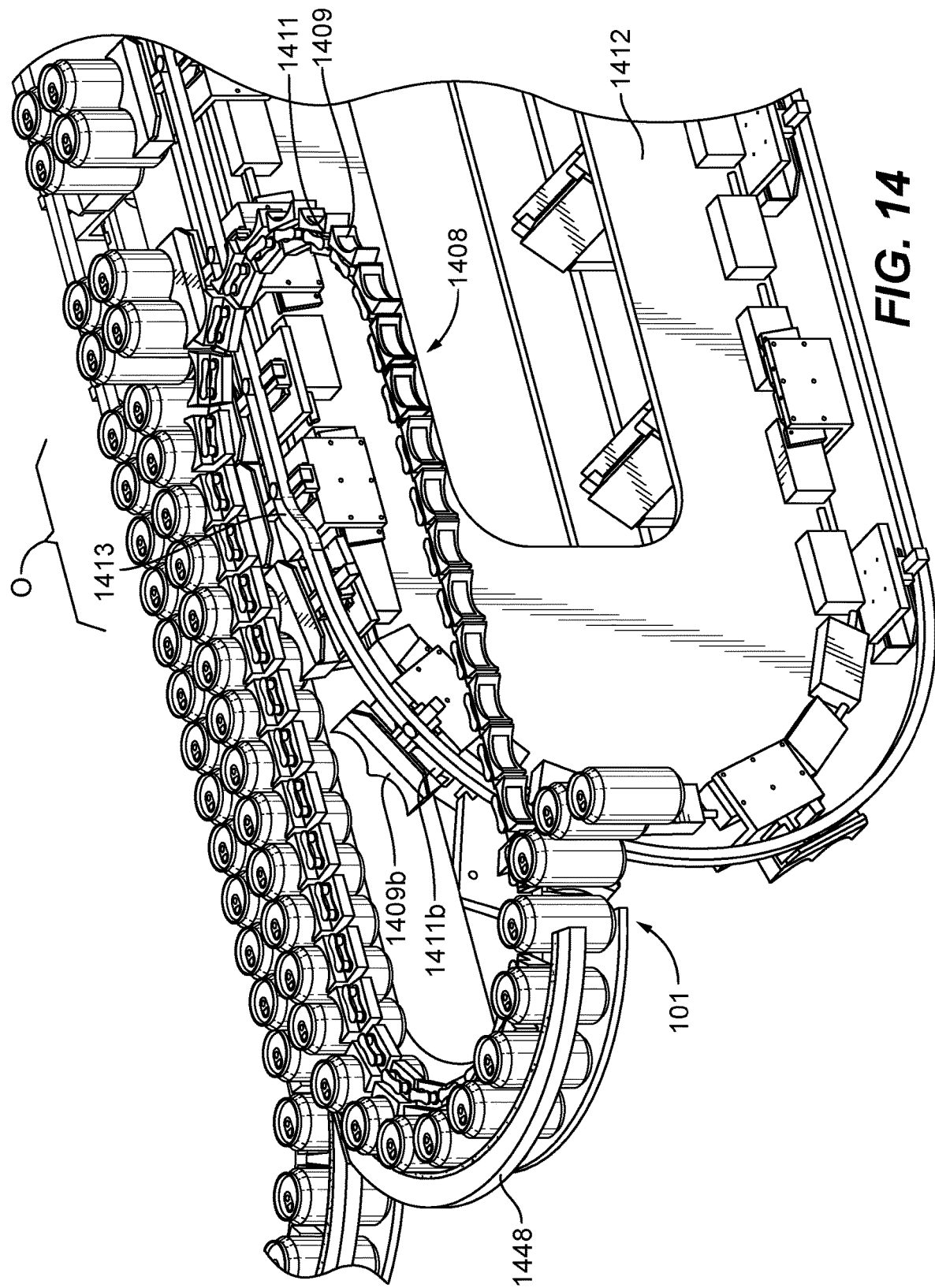
FIG. 14 is a perspective view of the system of FIG. 5, showing interaction of the second track with the first track.
Figure 15:
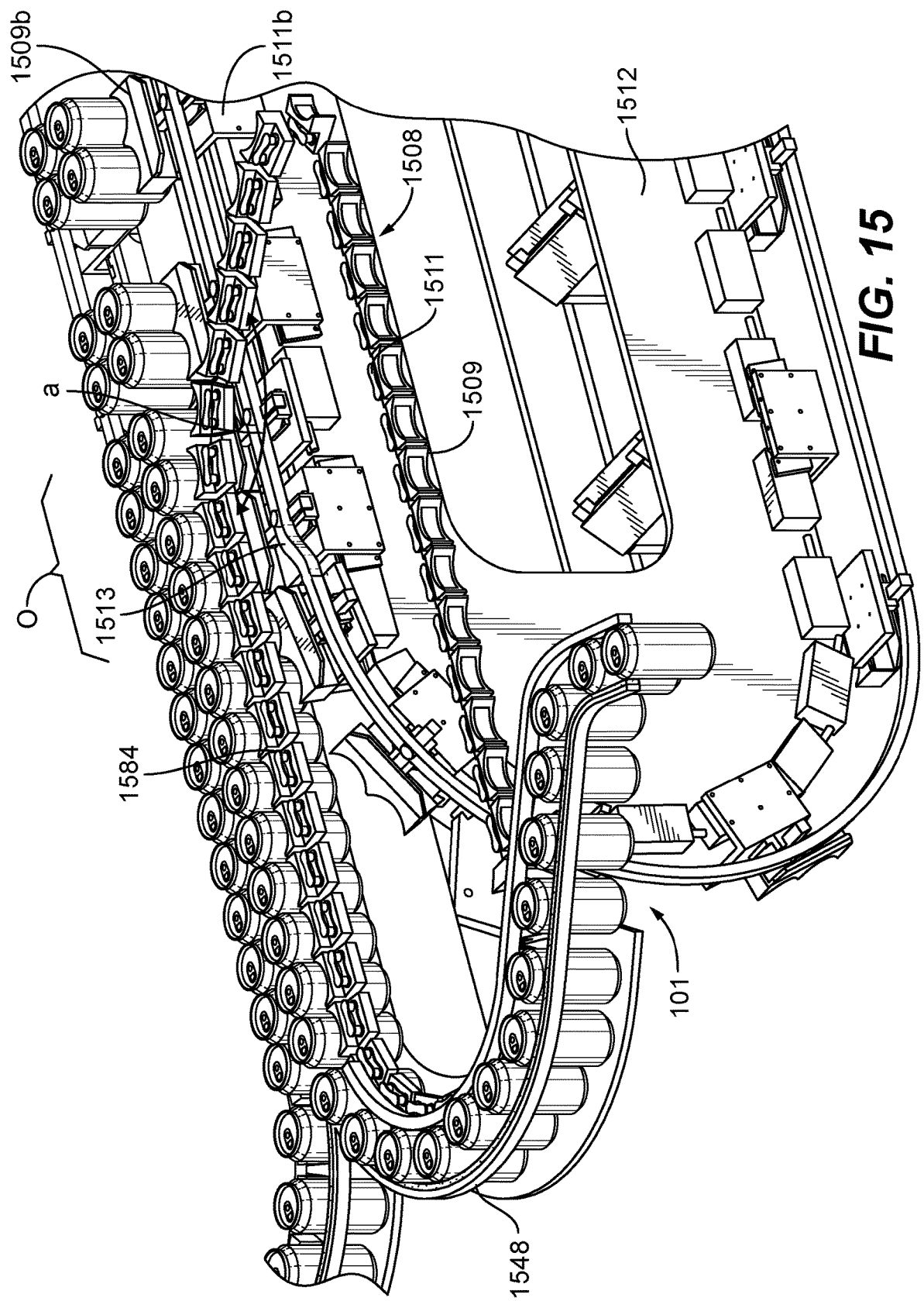
FIG. 15 is a perspective view of the system of FIG. 6, showing interaction of the second track with the first track.

FIG. 14, shows another embodiment wherein the lugs 1411 are each attached and driven by a linear chain 1410, where the lugs 1411 and containers 101 travel at a constant velocity around the track 1408. This embodiments conveys the stream of containers 101 to a downstream packaging station or to second set of lugs 1411 and grippers 1409 that would produce the groups of containers 101. FIG. 15 shows yet another embodiment of the track 1508 where the track 1508 is horizontal but not strictly oval in shape. The track 1508 is skewed at one point at location "a." The oblong shape allows for a smoother departure of the grippers 1509 from each of the containers 101, since the turning angle of the grippers 1509 is not as sharp, this decreases the chances of the gripper 1509 shifting the container as it peels away.

Each of the embodiments shown in FIGS. 14 and 15 can be paired with a second track responsible for receiving the containers 101 from the linear chain and grouping them, again while not disturbing and disorienting the containers 101. The grouping modules 106 in these embodiments include a second track 1512 to move a second plurality of lugs 1511b and a second plurality of grippers 1509b after receiving containers 101 from the first track. The second set of grippers 1509b group the containers 101 into packs, and move the packs along also without changing an orientation of the each container. While, the first plurality of grippers 1509 and the first plurality of lugs 1511 move about the horizontal plane, the second plurality of grippers 1509 and the second plurality of lugs 1511 are move about a vertical plane. Further, the second track 1512 follows an oval but includes a horizontal protuberance 1513 which forces each lug and attached gripper 1509b towards the container 101. The second track 1512 can include a linear motor servo drive to actuate each of the lugs 1511b along the second track 1512. The lugs 1511b and grippers 1509b of the second track, are positioned below the grippers 1509 and lugs 1511 of the first track when both sets contact the container 101. This allows the system 100 to handle taller containers 101.

Further seen in FIGS. 15 and 14, the first track 1508 and the second track 1512 partially overlap each other in the area indicated in FIG. 15 by reference the letter "o" and are partially aligned in the same direction, such that the grippers 1509 of the first track and the grippers 1509b of the second track contact the container 101 at the same time for a period of time in the area "o" as track 1208 hands the containers 101 of the second track 1212. The overlap of the tracks also allows for a more compact floor space arrangement because two vertical or two horizontal tracks would not be able to overlap without having to move the container vertically. During handing off, the container 101 from the first set of gripper 1509 to the second set of gripper 1509 the container 101 are simultaneously driven by the container 101 of stream of containers 101 by a gripper 1509 of a second plurality of grippers 1509 along the straight path of the first track. The grippers 1509 of the first plurality of grippers 1509 are withdrawn as they peel away from contacting the container 101 of the stream of containers 101.

The gripper 1509 of the first plurality of grippers 1509 and the gripper 1509 of the second plurality of grippers 1509 drive the respective container 101 at the same velocity when both are in contact with the container. This arrangement allows for a smooth transition from the containers 101 being pushed along by the first set of lugs 1511 and grippers 1509 to later the containers 101 being pushed along by the second set of grippers 1509. Also seen in the previously discussed Figures, as the lugs 1511 follow a track, and are connected to corresponding gripper bodies 144, a curved guide 1448 is placed at the location where the grippers 1509 pick up the containers 101 from the orienting module 1504 and follows the track to the first straight section. The guide 1448 helps bias the containers 101 against the gripper bodies.

Figure 16:
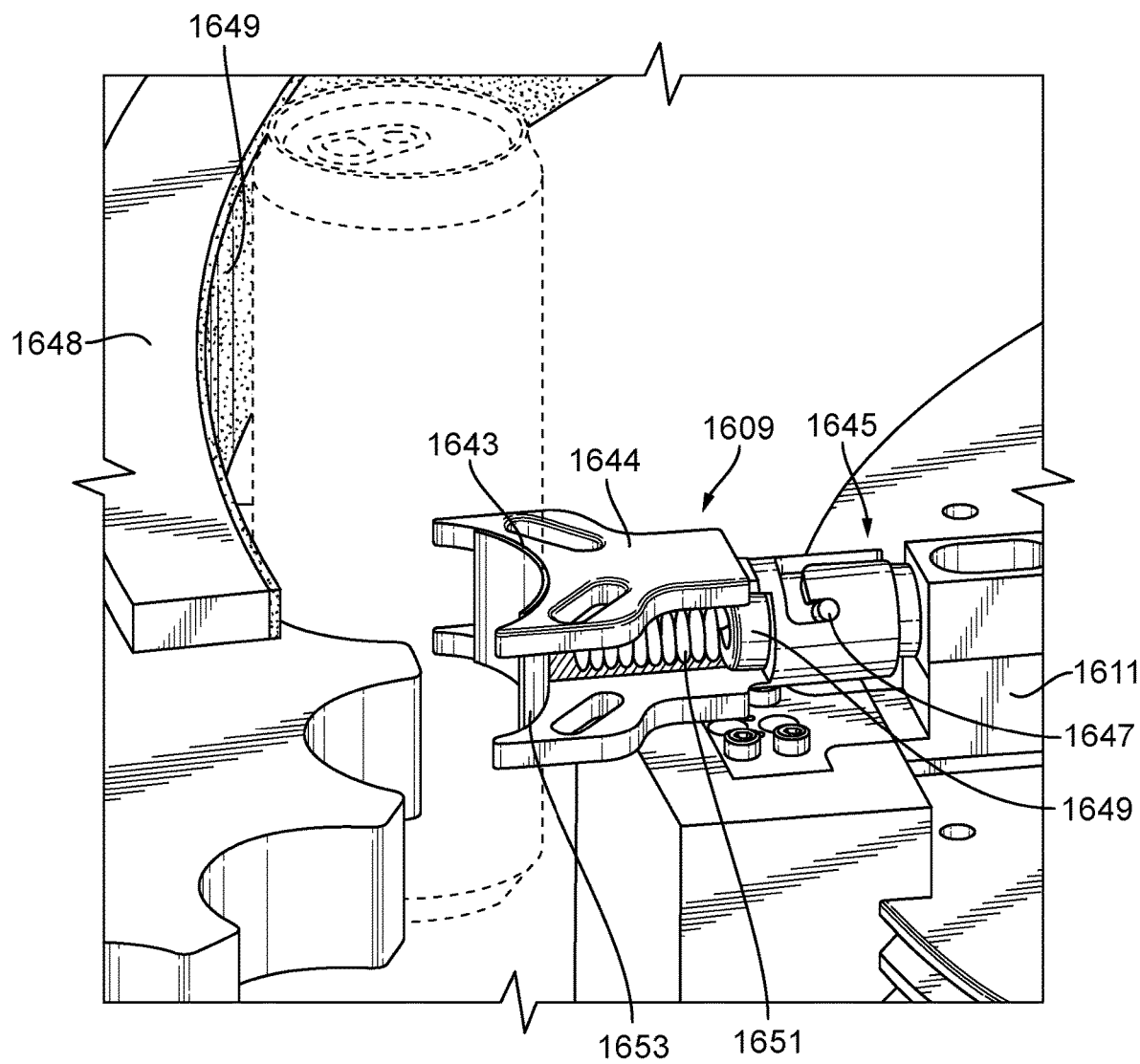
FIG. 16 is a perspective view of a gripper of the system of FIG. 1.

FIG. 16 shows a partial cut away view of the gripper 1609 used by grouping station in the embodiments described above. Each gripper 1609 includes a gripper body 1644, which partially surrounds and drives a corresponding container 101 along the track. Each gripper body 1644 includes a receiving end 1643 and a locking end 1645. Each gripper body 1643 is coupled by the locking end 1645 to the lug 1611. The coupling 1645 which is located on the locking end 1645 of each gripper body 142 is a bayonet style lock. This coupling style allows for an easy changeover of the gripper 1609 depending on the size and shape of the container. Each lug 1611 includes a horizontally extended shaft 1649 configured to connect to the coupling of the gripper body 1643.

FIG. 16 further shows a dampener 1651 positioned within each gripper body 142. The dampener 1651, e.g. a spring, dash pot, cushion, or the like, allows for smoothly reacting to a container 101 that is out of place and also acts as a shock absorber in order to not damage the container 101 when coming into contact with the container. An insert 1653 can be placed in the convex portion of the gripper body such that when it comes in contact with the container 101 it helps keep the container 101 oriented in the proper position. The insert 1653 includes material having a higher coefficient of friction than the gripper body 1644. The insert 1653 can be an adhesive strip, such as fugitive glue. The insert 1653 also has a higher coefficient of friction than a contact surface of the guide described above. This combination of friction coefficients allows the gripper to slide the container 101 along the guide without the container 101 changing an orientation or slipping from the gripper, especially along the curved portion of the track where the lug and gripper are accelerating. As the gripper 1609 and container 101 move past the guide, the insert 1653 helps maintain the orientation of the container. This type of adhesive allows the gripper to keep the container 101 from rotating, but also allows the gripper to peel away at the necessary stage without affecting the orientation of the container.

Figure 17:
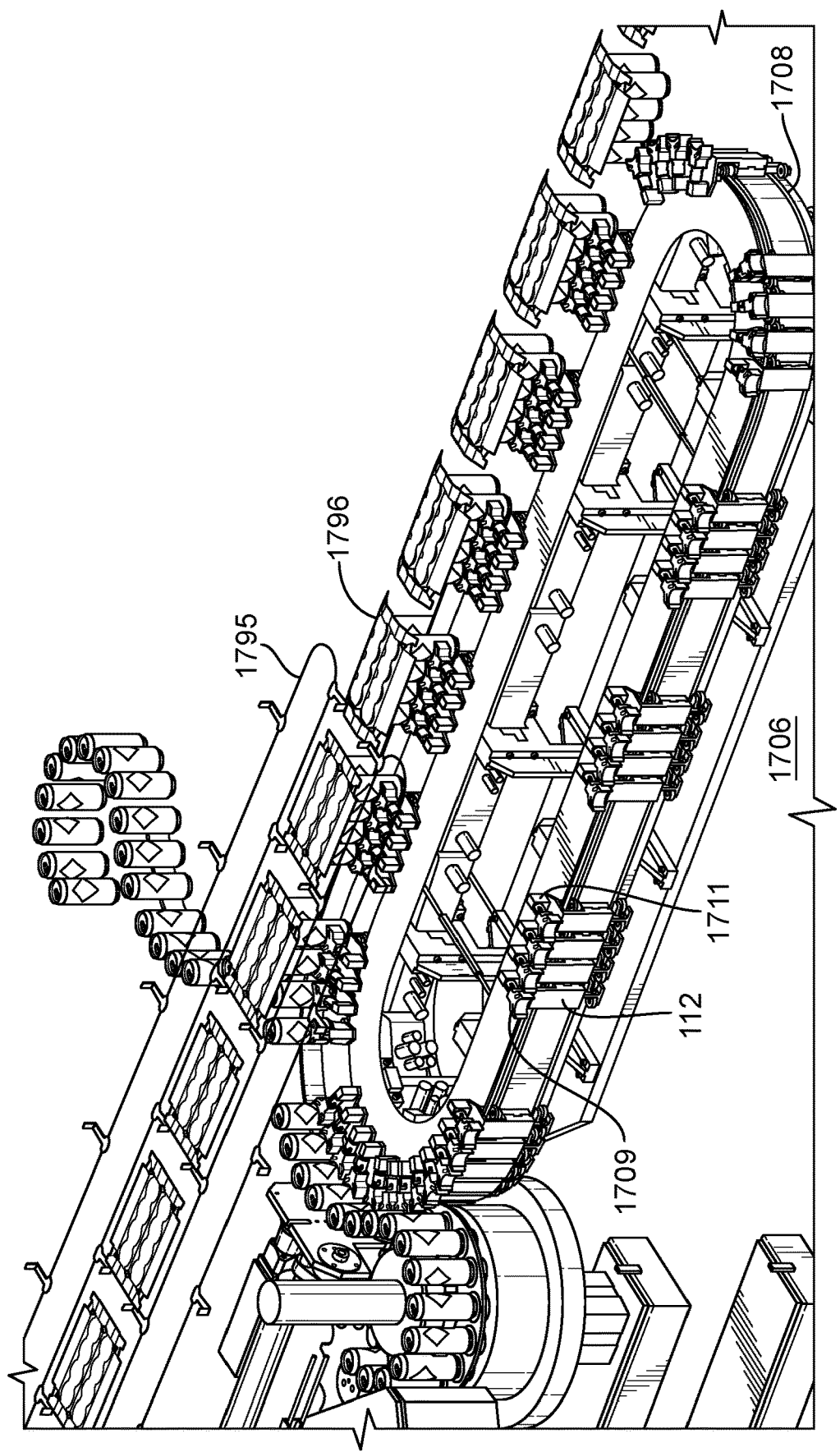
FIG. 17 is a perspective view of a system of FIG. 1, showing a possible placement of a packing apparatus.

FIG. 17, shows how an embodiment previously shown in FIGS. 1, 2, and 7 can be used in conjunction with a packaging apparatus 1795. The packaging apparatus 1795 partially overlaps with the track 1708 and is able to overlay packaging 1796, whether it is cardboard as shown or plastic wrap, while the grippers 1709 are still in contact with the containers 101. This arrangement further ensures that containers keep their intended orientation all the way through the packaging process.

The methods and systems of the present disclosure, as described above and shown in the drawings, provide for a packaging system with superior properties. While the apparatus and methods of the subject disclosure have been shown and described with reference to embodiments, those skilled in the art will readily appreciate that changes and/or modifications may be made thereto without departing from the spirit and score of the subject disclosure.

What is claimed is:

1. A conveyance system, comprising:
a first upstream star wheel configured to move a plurality of first containers along a first travel path;
a first downstream star wheel configured to move the plurality of first containers along the first travel path;
a first metering screw between the first upstream start wheel and the first downstream star wheel to move the plurality of first containers along the first travel path, wherein the first metering screw is configured to create a pitch such that the first containers enter the first metering screw at a first pitch and exit the first metering screw at a second pitch different than the first pitch;
a plurality of first support bodies with a surface that partially surrounds the first containers,
wherein the plurality of first support bodies are located downstream of the first downstream star wheel and are configured to engage the first containers as the first containers move downstream for a packaging to be applied to the first containers,
wherein the plurality of first support bodies are operatively connected to be moved about a first support body path that comprises at least two straight sections, and at least one curved section; and
a packaging path, along which the packaging is conveyed, that at least partially overlaps with the first support body path to form a package comprising the packaging and the first containers while the plurality of first support bodies maintain contact with the first containers.

2. The conveyance system of claim 1, comprising:
a second upstream star wheel configured to move a plurality of second containers along a second travel path;
a second downstream star wheel configured to move the plurality of second containers along the second travel path;
a second metering screw between the second upstream start wheel and the second downstream star wheel to move the plurality of second containers along the second travel path,
wherein the second metering screw is configured to create a pitch such that the second containers enter the second metering screw at a third pitch and exit the second metering screw at a fourth pitch different than the third pitch;
a plurality of second support bodies with a surface that partially surrounds the second containers,
wherein the plurality of second support bodies are located downstream of the second downstream star wheel and are configured to engage the second containers as the second containers move downstream for a packaging to be applied to the second containers,
wherein the plurality of second support bodies are operatively connected to be moved about a second support body path that comprises at least two straight sections, and at least one curved section; and
wherein the packaging path at least partially overlaps with the second support body path to form the package further comprising the second containers while the plurality of second support bodies maintain contact with the second containers.

3. The conveyor system of claim 1, further comprising a plurality of first moving turning members to rotate at least some of the first containers into a first predefined orientation, wherein the plurality of first support bodies are located downstream of the plurality of first moving turning members.

4. A conveyor system, comprising:
a first upstream star wheel configured to move a plurality of first containers along a first travel path;
a first downstream star wheel configured to move the plurality of first containers along the first travel path, wherein the first downstream star wheel is located downstream of the first upstream star wheel in a conveying direction in which the first containers are conveyed; and
a plurality of first support bodies with a surface that engages with the first containers as the first containers move downstream for packaging to be applied to the first containers,
wherein the plurality of first support bodies are operatively connected to be moved about a first support body path, and
a packaging path, along which a packaging is conveyed, that at least partially overlaps with the first support body path to overlay the packaging onto tops of the first containers while the plurality of first support bodies maintain contact with the first containers.

5. The conveyor system of claim 4, further comprising a first metering screw between the first upstream start wheel and the first downstream star wheel to move the plurality of first containers along the first travel path, wherein the first metering screw is configured to create a pitch such that the first containers enter the first metering screw at a first pitch and exit the first metering screw at a second pitch different than the first pitch.

6. The conveyor system of claim 5, further comprising a plurality of first moving turning members to rotate at least some of the first containers into a first predefined orientation, wherein the plurality of first support bodies are located downstream of the plurality of first moving turning members.

7. The conveyor system of claim 4, wherein the first support body path includes at least two straight sections and at least one curved section.

8. The conveyor system of claim 4, wherein a distance between divots of the first downstream star wheel is greater than a distance between divots of the first upstream star wheel.

9. The conveyor system of claim 4, further comprising:
a second upstream star wheel configured to move a plurality of second containers along a second travel path;
a second downstream star wheel configured to move the plurality of second containers along the second travel path, wherein the second downstream star wheel is located downstream of the second upstream star wheel in a conveying direction in which the second containers are conveyed;
a plurality of second support bodies with a surface that engages with the second containers as the second containers move downstream for packaging to be applied to the second containers,
wherein the plurality of second support bodies are operatively connected to be moved about a second support body path; and
wherein the packaging path at least partially overlaps with the second support body path to overlay the fiber-based packaging onto tops of the second containers while the plurality of second support bodies maintain contact with the second containers.

10. The conveyor system of claim 9, further comprising a second metering screw located between the second upstream star wheel and the second downstream star wheel to move the plurality of second containers along the second travel path, wherein the second metering screw is configured to create a pitch such that the second containers enter the second metering screw at a third pitch and exit the second metering screw at a fourth pitch different than the third pitch.

11. The conveyor system of claim 10, further comprising a plurality of second moving turning members to rotate at least some of the second containers into a second predefined orientation, wherein the plurality of second support bodies are located downstream of the plurality of second moving turning members.

12. The conveyor system of claim 9, wherein the second support body path includes at least two straight sections and at least one curved section.

13. The conveyor system of claim 9, wherein a distance between divots of the second downstream star wheel is greater than a distance between divots of the second upstream star wheel.

14. The conveyor system of claim 4, wherein the plurality of first support bodies are operatively connected to be moved about the first support body path by a chain.

15. The conveyor system of claim 4, wherein the plurality of first support bodies are operatively connected to be moved about the first support body path by a linear servo drive.

16. A conveyor system, comprising:
a first upstream star wheel configured to move a plurality of first containers along a first travel path;
a first metering screw located downstream of the first upstream star wheel, and configured to move the plurality of first containers along the first travel path; and
a plurality of first moving turning members configured to rotate at least some of the first containers into a first predefined orientation;
wherein the plurality of first moving turning members and the first containers are configured to move relatively to each other such that an engaging portion of the moving turning members contacts the first containers to rotate at least some of the first containers into the first predefined orientation via rotation of at least a portion of the moving turning members that includes the engaging portion.

17. The conveyer system of claim 16, wherein the first metering screw is configured to create a pitch such that the first containers enter the first metering screw at a first pitch and exit the first metering screw at a second pitch different than the first pitch.

18. The conveyer system of claim 17, further comprising a first downstream star wheel configured to move the plurality of first containers along the first travel path.

19. The conveyer system of claim 18, wherein the first metering screw is located between the first upstream star wheel and the first downstream star wheel to move the plurality of first containers along the first travel path.

20. The conveyor system of claim 18, further comprising:
- a plurality of first support bodies with a surface that engages with the first containers as the first containers move downstream for packaging to be applied to the first containers,
- wherein the plurality of first support bodies are located downstream of the plurality of first moving turning members,
- wherein the plurality of first support bodies are operatively connected to be moved about a first support body path; and
- a packaging path, along which a fiber-based packaging is conveyed, that at least partially overlaps with the first support body path to overlay the fiber-based packaging onto tops of the first containers while the plurality of first support bodies maintain contact with the first containers.

\* \* \* \* \*